United States Patent
Luby et al.

(10) Patent No.: US 11,863,317 B2
(45) Date of Patent: Jan. 2, 2024

(54) METHODS FOR RELIABLE LOW LATENCY DATA DELIVERY USING ERASURE CODES AND FEEDBACK

(71) Applicant: BitRipple, Inc., Berkeley, CA (US)

(72) Inventors: Michael George Luby, Berkeley, CA (US); Lorenz Christoph Minder, Evanston, IL (US)

(73) Assignee: BitRipple, Inc., Berkeley, CA (US)

( * ) Notice: Subject to any disclaimer, the term of this patent is extended or adjusted under 35 U.S.C. 154(b) by 0 days.

(21) Appl. No.: 17/891,891

(22) Filed: Aug. 19, 2022

(65) Prior Publication Data

US 2023/0060948 A1 Mar. 2, 2023

Related U.S. Application Data

(60) Provisional application No. 63/236,919, filed on Aug. 25, 2021.

(51) Int. Cl.
*H04L 1/00* (2006.01)
*H04L 1/1607* (2023.01)
*H04L 1/20* (2006.01)

(52) U.S. Cl.
CPC .......... *H04L 1/0042* (2013.01); *H04L 1/0056* (2013.01); *H04L 1/1621* (2013.01); *H04L 1/203* (2013.01)

(58) Field of Classification Search
CPC ... H04L 1/0042; H04L 1/0056; H04L 1/1621; H04L 1/203; H04L 1/0041

USPC .......................................... 714/748–750, 776
See application file for complete search history.

(56) References Cited

U.S. PATENT DOCUMENTS

| | | | | |
|---|---|---|---|---|
| 7,478,165 | B2* | 1/2009 | Gemmell | H04L 12/1877 714/13 |
| 10,554,565 | B2* | 2/2020 | Ho | H04L 69/161 |
| 2005/0226272 | A1* | 10/2005 | Luby | H04L 69/16 370/473 |
| 2010/0017686 | A1* | 1/2010 | Luby | H04N 21/4384 714/776 |
| 2010/0074255 | A1* | 3/2010 | Harpaz | H04L 47/10 370/390 |
| 2013/0246846 | A1* | 9/2013 | Oyman | G06F 11/1415 714/18 |
| 2014/0201587 | A1* | 7/2014 | Luby | H04L 1/22 714/751 |
| 2015/0222555 | A1* | 8/2015 | Rickeby | H04L 47/2416 370/230 |
| 2016/0226529 | A1* | 8/2016 | Dung Dao | H04L 65/765 |
| 2020/0106824 | A1* | 4/2020 | Erkin | H04L 65/70 |
| 2020/0329388 | A1* | 10/2020 | Gogoi | H04L 65/762 |
| 2020/0396275 | A1* | 12/2020 | Zhu | H04L 67/131 |

* cited by examiner

*Primary Examiner* — Albert Decady
*Assistant Examiner* — Osman M Alshack
(74) *Attorney, Agent, or Firm* — Haynes and Boone, LLP

(57) ABSTRACT

Data can be sent from a sender to a receiver with reliability of transmission encoding data blocks into packets each having a packet header and a packet payload, a block size, a global packet sequence number that uniquely identifies the packet relative to other packets of the data, a block identifier of the data block, and an encoding identifier. The sender determines from feedback from the receiver whether packets are lost and sends repair packets as needed.

34 Claims, 20 Drawing Sheets

| Variable | Description/Uses |
|---|---|
| seqno | a value representing a global sequence number of the most recent packet sent by the sender |
| fseqno | a value representing the largest global sequence number the sender has received in feedback from the receiver indicative of what the receiver has received |
| rseqno | a value representing a total number of packets the receiver has reported as received in feedback received at the sender |

FIG. 4

| Block Variable | Description/Uses |
|---|---|
| $K_i$ | size of block $i$ in units of packet payloads |
| $X_i$ | number of packets of encoded data the receiver has reported as received for block $i$ (as determined at the sender based on feedback received at the sender from the receiver, which would be the number up through the packet with feedback global sequence number $fseqno$) |
| $Y_i$ | number of packets of data that the sender has sent for block $i$ up to and including the packet with the feedback global sequence number $fseqno$ |
| $Z_i$ | number of packets of data that the sender has sent for block $i$ up to and including the packet with the global sequence number $seqno$ |
| $R_i$ | number of packets of data that the sender can proactively send for block $i$ (possibly regardless of packet loss) |
| $pest$ | current sender estimate of the packet loss probability |
| $status_i$ | status of block $i$, possibly selected from {active, recoverable, recovered, abandoned, inactive} |
| $comp_i$ | an indication of whether all source data is available for active block $i$ |
| $timeout_i$ | an increment of time between a first time when all data for block $i$ is available at the sender and a second time when the sender is to abandon efforts for sending data for block $i$ |

FIG. 5

(Additional data structures might be maintained by the sender, one data structure per flow.)

| Per Flow Variable | Description/Uses |
|---|---|
| seqno0 | a value representing a global sequence number of the most recent packet sent by the sender within flow 0 |
| fseqno0 | a value representing the largest global sequence number the sender has received in feedback from the receiver indicative of what the receiver has received within flow 0 |
| rseqno0 | a value representing a total number of packets the receiver has reported as received in feedback received within flow 0 in feedback received at the sender |

FIG. 12

| Per Flow, Per Block Variable | Description/Uses |
|---|---|
| $XO_i$ | number of packets of encoded data the receiver has reported as received for block $i$ within flow 0 (as determined at the sender based on feedback received at the sender from the receiver, which would be the number up through the packet with feedback global sequence number $fseqno0$) |
| $YO_i$ | number of packets of data that the sender has sent for block $i$ within flow 0 up to and including the packet with the feedback global sequence number $fseqno0$ |
| $Z_i$ | number of packets of data that the sender has sent for block $i$ within flow 0 up to and including the packet with the global sequence number $seqno0$ |

(Additional data structures might be maintained by the sender, one data structure for each block and per each flow for a block.)

FIG. 13

METHODS FOR RELIABLE LOW LATENCY DATA DELIVERY USING ERASURE CODES AND FEEDBACK

CROSS-REFERENCES TO PRIORITY AND RELATED APPLICATIONS

This application is a non-provisional of, and claims the benefit of and priority from, U.S. Provisional Patent Application No. 63/236,919 filed Aug. 25, 2021, entitled "Methods for Reliable Low Latency Data Delivery Using Erasure Codes and Feedback."

The entire disclosure of the application recited above is hereby incorporated by reference, as if set forth in full in this document, for all purposes.

FIELD

The present disclosure generally relates to data transmission and reception, and more particularly to reliably low-latency data delivery over potentially lossy channels.

BACKGROUND

Data transmission from a source to a destination might be done by having the source of the data provide the data to a sender (a device, software, or system that transmits data) which can then transmit the data over a channel to a receiver (a device, software, or system that receives data from a channel) and the receiver can then process what it receives to reconstruct (as needed) the data and provide it to the destination (a device, software, or system that consumes the data). Of some concern is reliability, in that the channel might lose or distort some of the data in transit. There are several methods known to ensure reliability, in that the destination receives the data that the source sent and the source obtains assurances that the data was very likely received correctly at the destination.

One approach to provide reliable data transport is the use of a Transmission Control Protocol ("TCP"). The TCP protocol is the prevalent method used to reliably deliver multimedia streaming data from content providers over the Internet. Using the TCP protocol, a sender sends data in packets and relies on retransmission of packets lost en route between a sender and receiver to ensure reliability of the data to be delivered. With retransmission-based protocols, there can be several round-trip times (RTTs) of delivery latency when packets are lost en route between the sender and receiver, since a retransmission-based protocol adds at least an RTT to the delivery latency of a packet each time the packet is lost en route, and the same packet can be lost more than once en route. This additional delivery latency is acceptable when delivery latency budgets are not tight, e.g., when RTTs are sub-second and when it is acceptable to deliver data with several seconds, or up to 30-40 seconds or more of latency. This is because the typical strategy to delivery multimedia streaming data over the Internet is to buffer ahead at the receiver, i.e., the playback time of the streaming data that is currently being displayed at the receiver is many seconds delayed from the playback time of the streaming data that the receiver is currently downloading, and all of the intervening data is stored in a buffer at the receiver to be ready for playback, so there is plenty of time to retransmit lost packets of streaming data before playback of the data. A strength of using TCP, and retransmission-based protocols in general, is that the minimal amount of bandwidth is used to deliver data reliably. This is often crucial, as bandwidth can be a scarce resource that should be used as sparingly as possible.

For some data streaming applications, where a source does not provide the sender the data to be sent far in advance of when it is needed at the destination, delivery latency, or simply "latency", might be measured for some block of data by the time delay between the time when the first data of the block is made available to the sender to start processing and sending and the time when the receiver completes its reception and processing to output the block to the destination. That time period might include some time spent sending information from the receiver back to the sender to address lost or corrupted data as might be needed to complete recovery of the block of data.

With TCP-style retransmission, there can be long latencies. For some applications, such as online cloud gaming applications and metaverse-type applications and other interactive streaming applications, long latencies are unacceptable. A metaverse-type application might be an AR/VR/XR application for playing high-quality interactive games over the Internet, with avatars meeting and interacting in a volumetric-rich virtual world that feels realistic to end users. Having excessive delays in interaction would diminish the experience and since it can be interactive, it might not be possible to send all the needed data ahead of time. Thus, such applications might require consistent ultra-low latency data delivery. At the same time, such applications might also require efficient use of bandwidth, as much of the data to be sent with low latency is high-resolution data that can consume large amounts of bandwidth.

Retransmission-based solutions might not work well when reliable ultra-low latency delivery of data is required and when there is any kind of packet loss. For one, retransmission-based solutions can result in a delivery latency that varies dramatically depending on the actual packet loss. For example, when a packet is lost en route, the receiver identifies the lost packet and sends a packet identifier of the lost packet in feedback to the sender so that the sender knows to retransmit the packet, which adds at least an RTT to the delivery time of the packet. If the packet is lost en route again when the sender retransmits the packet, then the receiver again identifies the lost packet and sends the packet identifier in feedback to the sender so that the sender can retransmit the packet again. Depending on the amount of packet loss between the sender and receiver, this process may repeat several times before the packet is delivered to the receiver, causing several round-trip times (RTTs) of data delivery latency. It can be shown that data delivery latency variability is inherent with retransmission-based solutions, thus it is difficult for retransmission-based solution to achieve consistently reliable ultra-low latency data delivery.

One approach to that problem is to send the original streaming data in packets and accept, or hide as well as possible, displayed artifacts when there is packet loss. Some versions of the webRTC protocol use this approach. This approach might provide a less than ideal end user experience when, for example, the data to be delivered is highly compressed multimedia, which typically displays noticeable artifacts when parts of the compressed data to be displayed is not received.

Another method is to use a forward error correction erasure code at a fixed code rate to protect against packet loss up to a specified amount over a specified duration of time. This method needlessly consumes bandwidth when there is little or no packet loss, whereas data is not reliably delivered when the amount packet loss exceeds the specified amount of packet loss protection over the specified duration of time. Yet another method is to use retransmission-based protocols. Retransmission-based protocols are often used for example for video-conferencing applications, and often suffice for video-conferencing applications in terms of latency and the quality of the video, and they are bandwidth efficient, but as described above they do not work as well for applications with very high data rates and when consistent ultra-low latency is required.

Improvements are needed for providing consistent ultra-low latency reliable data delivery while at the same time minimizing or reducing the bandwidth needed to deliver data.

SUMMARY

A method of, and apparatus for, transmitting data of a data stream from a sender or sending system to a receiver or receiving system with reliability of transmission, wherein the reliability of transmission is indicated by a confirmation from the receiver to the sender that the data is considered received is provided. The method might comprise obtaining the data of the data stream to be sent from a source device coupled to the sender to a destination device, wherein the destination device is configured to receive data from the receiver in a presumed reliable form, organizing the data of the data stream into a sequence of one or more data blocks, each block having a block identifier associated therewith, encoding a data block of the one or more data blocks into a sequence of packets for the data block, wherein the packets of the sequence of packets for the data block are interchangeable among the sequence of packets, organizing data of a packet of the sequence of packets into a packet header and a packet payload, wherein the packet is to be processed such that it is either received correctly at the receiver or discarded at the receiver if it cannot be determined to be entirely recovered correctly, including, in the packet header of the packet, representations of at least (1) the block size, (2) a global packet sequence number that uniquely identifies the packet relative to other packets of the data stream, (3) a block identifier of the data block, and (4) an encoding identifier indicating which encoded data derived via the encoding process from the data block is carried in the packet payload, including, in the packet payload of the packet, encoded data derived from the data block and identified by the block identifier of the data block and the encoding identifier included in the packet header, determining a sendable number of packets for the data block, comparing a total number of sent packets, sent from the sequence of packets for the data block, and the sendable number of packets for the data block, and based on whether the total number of sent packets is less than the sendable number, sending the packet to the receiver.

The packets of the sequence of packets can be interchangeable if an exact copy of the data block from which the sequence of packets is generated can be decoded, using an erasure decoding process or otherwise, from any set of a sufficient number of packets from the sequence. The sufficient number of packets can be equal to or slightly more than the data block size in units of packet payloads.

Determining the sendable number of packets for a block might comprise determining a function, E( ), that maps an integer number of packets sent from the sequence of packets for the data block to an expected number of packets to be received at the receiver from the sequence of packets for the data block, wherein if X is equal to an integer number of packets sent from the sequence of packets for the data block, then E(X) is equal to an estimate of the number of packets expected to arrive at the receiver from the sequence of packets for the data block, with E(X) determined for at least one value of X, determining a target value for a number of packets to arrive at the receiver equal to a sum of the block size and a predetermined additional number, and setting the sendable number to be a value, N, with N being selected such that E(N) is approximately equal to the target value. The predetermined additional number might be determined based on the block size of the data block. The predetermined additional number might be a square root of the block size or a constant multiplied by a square root of the block size. The constant might be 1, 1.5, 2, or some other number.

The method might further comprise receiving, at the sender, feedback from the receiver, the feedback comprising at least: (1) a feedback global packet sequence number corresponding to the largest global packet sequence number received at the receiver among correctly received packets of all data blocks of the sequence of data blocks up to some point in time; and (2) a corresponding feedback global packet count corresponding to the total number of correctly received packets of all data blocks of the sequence of data blocks at the receiver up to the same point in time, wherein determining the sendable number of packets for the data block is based, at least in part, on one or more received feedback global packet sequence numbers and corresponding feedback global packet counts. Determining the sendable number might comprise determining, for a given total integer number, N, of packets sent from the sequence of packets for the data block, an expected number of packets, E(N), to be received at the receiver from the sequence of packets for the data block, based on a packet loss estimate that is determined, at least in part, on one or more received feedback global packet sequence numbers and corresponding feedback global packet counts, and determining the sendable number of packets for the data block as a value of N such that E(N) is approximately the sum of the block size and a predetermined additional number, and calculating, at the sender, an updated packet loss estimate based on an updated feedback global packet sequence number and corresponding feedback global packet count using an exponentially weighted moving average packet loss calculation, where the half-life of the exponentially weighted moving average is approximately the difference between the global packet sequence number in the packet header of the most recent packet sent by the sender and the largest feedback global packet sequence number received from the receiver.

The sender might receive an updated feedback global packet sequence number and corresponding feedback global packet count, wherein the updated feedback is determined at the receiver at a later point in time than the previous feedback, and determine an updated sendable number of packets for the data block determined, at least in part, based on the updated feedback global packet sequence number and corresponding feedback global packet count. The sender might receive one or more additional feedback global packet sequence numbers and corresponding feedback global packet counts in a feedback packet from the receiver. The feedback from the receiver might comprise a feedback block packet count, wherein a feedback block packet count is an indication of a total number of packets received for the data block up to some point in time, and the sender might determine the sendable number of packets for the data block, at least in part, based on one or more feedback global packet sequence numbers and corresponding feedback global packet counts and on the one or more feedback block packet counts for the block received from the receiver.

The sendable number might be a sum of S and N, where S is a total number of already sent packets from the sequence of packets for the data block having a global packet sequence number no greater than L, where L represents the largest feedback global packet sequence number received by the sender from the receiver, where the value of N is determined so that the sum of E(N) and C is approximately the sum of the block size in units of packet payloads and a predetermined additional number, where E(N) is an expected number of packets to arrive at the receiver from sending of N packets from the sequence of packets for the data block containing a global packet sequence number that is larger than L, and where C is the largest feedback block packet count for the block received from the receiver. Determining E(N) from N might be based on a packet loss estimate that is determined, at least in part, based on one or more feedback global packet sequence numbers and corresponding feedback global packet counts received from the receiver.

The sender might receive an updated feedback global packet sequence number and corresponding feedback global packet count and an updated feedback block packet count for the block from the receiver, and determine an updated sendable number of packets for the data block based on the updated feedback global packet sequence number and corresponding feedback global packet count and the updated feedback block packet count.

The sender might receive feedback block packet counts for one or more data blocks in a feedback packet from the receiver, and/or one or more feedback global packet sequence numbers and corresponding feedback global packet counts and a feedback block packet count for one or more data blocks in a feedback packet from the receiver.

A data block might be recoverable at the receiver from receiving a subset of the sequence of packets for the data block, and wherein the number of packets in the subset is greater than or equal to the block size of the data block in units of packet payloads.

The sender might send packets at a rate that is determined by application requirements and the amount of bandwidth available between the sender and the receiver.

The sender might send a next packet to the receiver from a block that is earliest in the sequence of blocks for which the sender has not received confirmation from the receiver that the block has been received and for which the number of packets sent so far from the block is less than the sendable number of packets for the data block.

The sequence of packets for the data block might comprise base packets and repair packets, wherein packet payloads of base packets include portions of the block of data, and packet payloads of repair packets include encoded data that is generated based on the block of data using an erasure code. The sequence of packets for the data block might comprise repair packets, wherein packet payloads of repair packets include encoded data that is generated based on the block of data using an erasure code.

A method is provided for transmitting data of a data stream reliably from a sender to a receiver, wherein reliability of transmission is indicated by a confirmation from the receiver to the sender that the data is considered received, the method comprising obtaining the data of the data stream to be sent from a source device to a destination device, wherein the destination device is configured to receive data from the receiver in a presumed reliable form, organizing the data into a sequence of one or more blocks of data, each block having a block identifier associated therewith, encoding a block of the one or more blocks of data into a sequence of packets for the block, organizing data of a packet of the sequence of packets for a block into a packet header and a packet payload, wherein the packet is to be processed such that it is either received correctly at the receiver or discarded at the receiver if it cannot be determined to be entirely recovered correctly, including, in the packet header of the packet, a first indication and a second indication, wherein the first indication comprises a block size and a block identifier of a block and an encoding identifier from which the packet payload was derived and the second indication comprises a global packet sequence number that uniquely identifies the packet relative to other packets of the data stream, including, in the packet payload of the packet, encoded data derived from the block of data identified by the block size and the block identifier and the encoding identifier included in the packet header, determining a sendable number of packets for the block, sending the packet to the receiver for the block if the total number of packets sent so far from the sequence of packets for the block is less than the sendable number of packets for the block, receiving, from the receiver, a third indication of a largest global packet sequence number among packets received correctly at the receiver and a fourth indication of a total number of packets received correctly, determining, at the sender, the sendable number of packets for the block, at least in part, based on the third indication and the fourth indication, wherein packets of the sequence of packets for the block are interchangeable with packets lost from the plurality of packets of the sequence of packets for the block to recover the block.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of methods and apparatus, as defined in the claims, is provided in the following written description of various embodiments of the disclosure and illustrated in the accompanying drawings.

BRIEF DESCRIPTION OF THE DRAWINGS

Various embodiments in accordance with the present disclosure will be described with reference to the drawings, in which:

FIG. 4 illustrates an example sending session state table as might be maintained by a sending system for a particular sending session, according to various embodiments.

FIG. 5 illustrates an example block state table as might be maintained by a sending system for a particular block of data being sent by the sending system, according to various embodiments.

FIG. 12 illustrates an example flow state table as might be maintained by a sending system for a particular data flow, according to various embodiments.

FIG. 13 illustrates an example block-flow state table as might be maintained by a sending system per block and per flow for a block, according to various embodiments.

DETAILED DESCRIPTION

Figure 1:
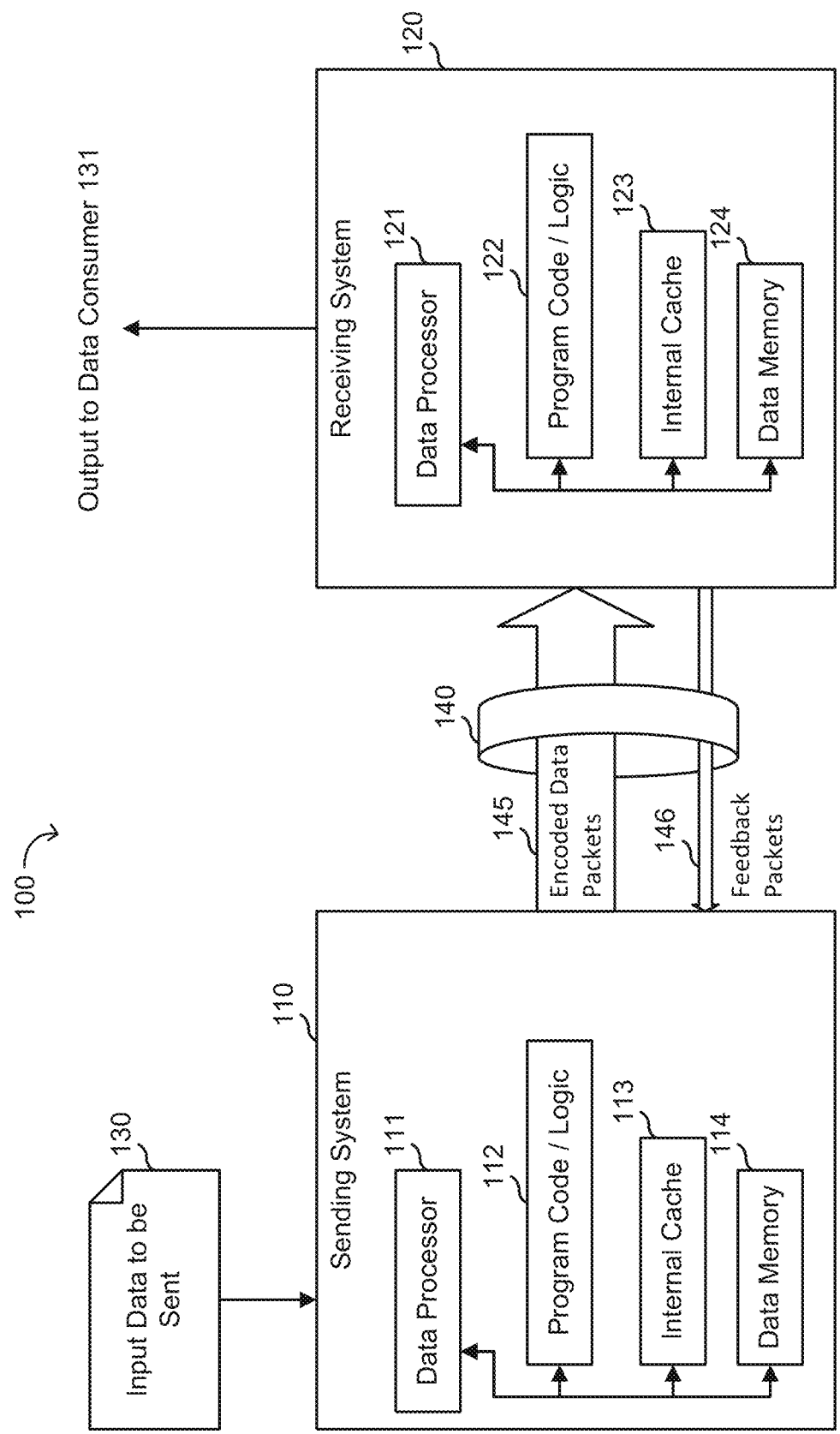
FIG. 1 is a block diagram illustrating a sending system and a receiving system for conveying data over a channel, such as a network, according to various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Various embodiments described herein provide methods and apparatus for reliably delivering data from a sender to a receiver over a channel, such as a packet network channel, where the data is carried in packets that may be lost en route. The data stream is partitioned into blocks at the sender and each block is reliably delivered to the receiver. Each block may be of variable size and may in some cases be aligned with the boundaries of application data objects. The delivery latency for a block is the time between when the first data of the block is available at the sender and when the receiver recovers the block.

In the general case, a sender organizes data from a source into one or more blocks and encodes a block into a sequence of packets. Some of these operations might be performed prior to receipt by the sender, but either way the sender can operate on blocks and packets. Typically, a packet is a unit of data that is to be sent and is expected to be received correctly in its entirety (based on whatever packet handling protocol might be needed) or discarded in its entirety. The blocks are in an order that might correspond to the order that the blocks are provided to the sender and the order the blocks are preferably recovered at the receiver. The data of a block might be encoded by the sender, such as using an erasure code, to form encoded packets, which may include base packets and repair packets, which are sent to the receiver. The payloads of the base packets include all the original data from the data block, and thus a receiver can correctly recover the entire block upon receiving all the base packets. The repair packets are packets sent with the base packets and are usable to recover from lost packets of the base packets, and wherein the number of generated and sent repair packets can vary dynamically during the transmission of encoded packets for the data block based on continuous feedback sent from the receiver to the sender indicating how many additional repair packets are needed and are usable to recover the data block. In some cases, the number of sent repair packets may not depend on any feedback. The blocks of a data stream might be encoded using a systematic code, wherein the base packets for a block correspond to the original data of the block partitioned into packet payloads, and thus the aggregate size of the base packet payloads is the size of the data block. Nonsystematic encoding might be used as well. Where nonsystematic encoding is used, the base packets and repair packets might be generated from a data block using the same process, which might be using an erasure code process. Where systematic encoding is used, the same process might be used to generate each repair packet (but with different input parameters to the process for each repair packet), and repair packets can be generated as needed on-the-fly based on received feedback.

In a particular instance, a sender transmits data of a data stream to a receiver. To ensure or improve reliability of transmission, wherein the reliability of transmission is indicated by a confirmation from the receiver to the sender that the data is considered received, various steps of organizing might be performed. For example, a data stream processor at the sender (or other system associated with or affiliated with the sender) obtains the data of the data stream to be sent from a source device coupled to the sender to a destination device and the destination device is configured to receive data from the receiver in a presumed reliable form. The data stream processor organizes data of the data stream into a sequence of one or more data blocks, each block having a block identifier associated therewith. The data stream processor then encodes a data block of the one or more data blocks into a sequence of packets for the data block, wherein the packets of the sequence of packets for the data block are interchangeable among the sequence of packets.

The packets of the sequence of packets can be interchangeable if an exact copy of the data block from which the sequence of packets is generated can be decoded, using an erasure decoding process or otherwise, from any set of a sufficient number of packets from the sequence. The sufficient number of packets can be equal to or slightly more than the data block size in units of packet payloads.

The data stream processor can then organize data of a packet of the sequence of packets into a packet header and a packet payload and include, in the packet header of the packet, representations of at least (1) the block size, (2) a global packet sequence number that uniquely identifies the packet relative to other packets of the data stream, (3) a block identifier of the data block, and (4) an encoding identifier indicating which encoded data, derived via the encoding process from the data block, is carried in the packet payload. The data stream processor can also include, in the packet payload of the packet, encoded data derived from the data block and identified by the block identifier of the data block and the encoding identifier included in the packet header.

The data stream processor can then determine a sendable number of packets for the data block, compare a total number of sent packets, sent from the sequence of packets for the data block, and the sendable number of packets for the data block, and based on whether the total number of sent packets is less than the sendable number, send the packet to the receiver. The sendable number of packets for a block represents a target total number of packets to be sent for the block. The sendable number of packets for a data block can be determined using a variety of different methods and processes as described in more detail herein. The sendable number of packets for a data block may vary during the process of sending packets from the sequence of packets for the data block based on feedback from a receiver.

Using these methods and apparatus, the bandwidth needed to reliably deliver a data stream can be kept low, and block delivery latency for each block of the data stream can also be kept low. For many applications, such as metaverse applications, it can be required that block delivery latency is reliably below a given threshold time for essentially all blocks of the data stream. Using these methods and apparatus, the amount of feedback needed from the receiver, both in terms of the frequency of sending feedback packets and in terms of the amount of bandwidth needed to carry the feedback data from the receiver to the sender, can be kept low. This can be important in some applications when the available bandwidth from the receiver to the sender is much less than the bandwidth from the sender to the receiver. Certified reliable delivery of data blocks, i.e., where the sender can certify that the receiver has recovered each block of the data stream, is often desirable as well.

Encoding might be such that a data block can be recovered from any combination of encoded packets from the base and repair packets equal in size to the data block in units of packet payloads (in rare cases, a slightly larger set of encoded packets may be needed to recover the data block). A fountain erasure code or a low-rate erasure code can be used. A fountain erasure code (also called a rateless erasure code) or a low-rate erasure code might be used with its ability to generate encoded packets as needed on-the-fly from a block of data. With a code that can generate encoded packets as needed, the number of packets of encoded data generated for a block can be easily adjusted as the sendable number of packets varies. The sender can be configured with an encoding functionality with which it can generate encoded data to insert into packet payloads that is encoded data encoded from the source data received by the sender and encoded according to the particular erasure code being used. The receiver can include a decoder that decodes the encoded data to recover the original data. Where the receiver needs to rely on the repair packets, the decoder can operate to recover from packet erasures.

In general, the specific lost encoded packets need not be retransmitted. Instead, the sender can generate and send additional repair packets as needed, and these can be independent of which particular encoded packets are lost. One advantage is that the receiver does not need to specifically request the lost encoded packets or inform the sender of which packets are lost. With the particular coding, there is a high probability that the repair packets will be useful to the receiver to recover the block for which the repair packets are sent in response to feedback from the receiver.

The erasure code used might support a wide range of block sizes, which has an advantage of not limiting the available block sizes at the sender to support data streams over a large range of transmission rates to be delivered over networks with a large range of packet round-trip times between the sender and the receiver. An erasure code might be systematic, in that data in a block is considered as encoded data for that block, and the sender can immediately start transmitting base packets of encoded data from a block before all data of the block is available to the sender. This can help reduce data block delivery latency.

One fountain erasure code (also called a rateless erasure code) that can be used is the RaptorQ code specified in IETF RFC 6330, as it is systematic (i.e., for the base packets, as a packet payload's worth of data is provided to the sender for a block, it can be packaged into a packet and sent, before other data is available at the sender), and the number of repair packets that can be generated need not be fixed ahead of time or be a fixed ratio relative to the number of base packets for a data block, and in particular repair packets can be generated on-the-fly as needed.

Overview of Sending System

For each data block, the sender can generate encoded packets for that data block using the erasure encoder. As each data block arrives at the sender, the sender can generate and send the encoded data as payloads in base packets and repair packets, and the sender is continuously receiving feedback from the receiver including packet loss statistics and block status statistics for blocks that are currently actively being sent. When feedback indicates there is minimal packet loss between the sender and receiver when a block first becomes available to send, the sendable number of packets for the block is typically large enough to allow all base packets to be sent, and the sendable number of packets may allow in addition sending some repair packets, wherein the aggregate number of repair packets allowed to be sent for the data block is a small percentage of the aggregate number of base packets. Thus, the sendable number of packets is slightly more than the block size in units of packet payloads, and thus if all of the sendable packets arrive at the receiver then the data block can be decoded. The sendable number of packets can be set to slightly more than the block size in units of packet payloads to anticipate that some base and repair packets may be lost en route to the receiver. When feedback indicates the packet loss between the sender and receiver is larger when a block first becomes available to send, the sender might set the sendable number of packets to be a larger number so that the aggregate number of repair packets allowed to be sent along with the base packets is a larger percentage of the number of base packets, anticipating that more of the base and repair packets may be lost en route to the receiver. One objective is to ensure that the sendable number of packets is large enough that with high probability the number of encoded packets that arrive at the receiver is at least the number of base packets (and thus the data block can be recovered), but not too much larger than the number of base packets (and thus not too much bandwidth is wasted in delivering the data block). The feedback protocol and the methods for determining the number sendable packets based on feedback described hereafter are designed to meet this objective. Feedback is used to automatically adjust the sendable number of packets for each data block to meet this objective for each data block.

The sender and receiver might maintain a listing of block status for one or more block, for example tracking the status of a block among status states selected from a set of status states {active, recoverable, recovered, abandoned, inactive} and process blocks, data, packets, etc. according to the status state of a block. The receiver might continually send a small amount of feedback on statistics related to each active data block, as well as overall statistics, and based on this feedback, the sender can decide to adjust the sendable number of packets for active blocks, which may cause the sender to generate and send more encoded packets for some of the active data blocks. Feedback can also be used to decide the initial sendable number of packets for a block, the sendable number of packets for a block when the first packets are sent for the block. The sender might initially set the sendable number of packets large enough so that all base packets can be sent, and an additional number of repair packets can be generated and sent, where the number of repair packets is determined based on feedback received up to that point in time. As the encoded packets are transmitted for a data block, the sender can use the continual feedback to dynamically adjust, either up or down, the sendable number of packets for the block, which may allow a number of additional repair packets to be generated and sent for the block. The feedback statistics sent for each block are sufficient for the sender to determine whether the receiver has recovered that block, thus enabling the sender to determine with certainty which blocks have been recovered by the receiver.

A block has a status of "active" at the sender from the time data from the block becomes available at the sender and the time when the sender receives confirmation from the receiver that either the block has been recovered or that the block is no longer relevant to the receiver.

When a current time is greater than a timeout value for a block while the status state for the block is "active", the sender might change the state status to "inactive" to stop working on sending that block. Feedback from a receiver might indicate that the receiver considers a block to be recovered (e.g., the receiver has recovered all of the data block from received encoded packets) or abandoned (e.g., where the receiver has not completed recovery of the block but no longer needs it), so after a receiver updates its listing of block status, it can provide feedback to the sender on the status state updates. This can be done with very little bandwidth back to the sender. The sender can then have the block status state changed to "inactive" for that block.

A receiver might return feedback indicating that a block is not yet recovered, but the receiver estimates that it is recoverable from the encoded data received so far, and thus indicate "recoverable" as its status state. This might be estimated when the receiver has received a quantity of encoded packets (any combination of base and repair packets) that are in aggregate payload size at least the size of the data block. A block might usually be recoverable if the number of packets ($X_i$) the receiver has received for a block i is at least the number ($K_i$) of packet payloads that are in aggregate size of block i (i.e., $K_i$ is the size of block i in units of packet payloads, and thus $K_i$ is the number of base packets).

Overview of Example Structures

FIG. 1 provides a high-level view of the methods described herein. In system 100 illustrated there, input data to be sent (130) arrives at a sender (110) and the sender generates and sends encoded data packets (145) over a network (140) to a receiver (120). The receiver (120) on a regular basis sends feedback packets (146) to the sender, and the receiver (120) decodes and reproduces the data stream (131) that is as similar as possible to the input data to be sent (130). The input data to be sent (130) might be obtained from storage whereby all of the data might be available when the sending process starts and/or might be obtained as a stream whereby perhaps not all of the data is available when the sending process starts but is available during the sending process as needed.

The feedback received from the receiver allows the sender to set the sendable number of packets large enough for each block so that the number of sent encoded packets for each block ensures reliable recovery of the block at the receiver, allows the sender to minimize the amount encoded packets to ensure reliable recovery, and allows the sender to minimize the block delivery latency. At various times during a transmission process, the sender can determine if there is capacity to send additional packets. Whether or not there is capacity can depend on measured available bandwidth between the sender and receiver, or on a configured sending rate. As an example, when there is a configured sending rate, the sender has capacity to send an encoded packet when the size of an encoded packet divided by the time since the last encoded packet was sent is less than or equal to the configured sending rate. Whenever there is capacity to send, the sender can determine for which blocks the number of sent packets for that block is less than the sendable number of packets for that block, and thus additional encoded packets are eligible to be sent (hereafter referred to as eligible blocks) based on computations the sender performs, as described herein. The sender might be programmed to prefer earlier blocks and when it can generate and send additional encoded packets, they are from the block that was earliest to arrive at the sender (or earliest to be provided to the sender) from among the active eligible blocks. In some embodiments, the sending rate and bandwidth and latency are considered in a trade-off process, considering that some bandwidth might be consumed to increase a likelihood of very low latency.

Figure 2:
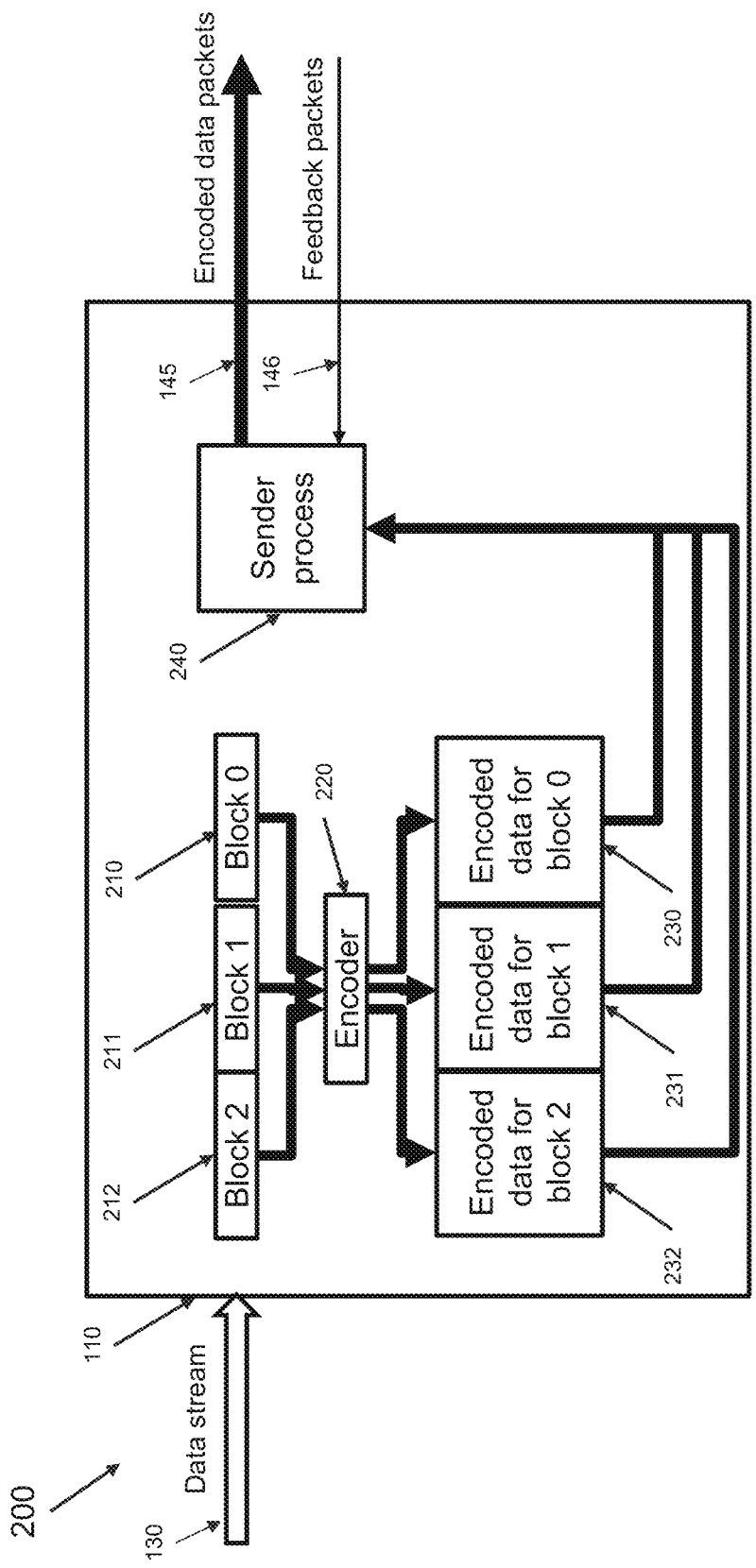
FIG. 2 is a block diagram depicting a sending system obtaining data and sending encoded data packets to a receiving system, according to various embodiments.

FIG. 2 provides a more detailed view 200 of apparatus and methods for a sender to send encoded data to a receiver as described herein. As the input data to be sent (130) arrives at a sender (110), the sender partitions the data stream into blocks of data (210, 211, 212), and uses an encoder (220) to generate encoded data for each block (230, 231, 232). A sender process (240) can be used to determine which encoded data to send in packets (145) at each point in time, and the sender process (240) can also process feedback packets (146) received from the receiver to facilitate the decisions made by the sender process (240).

Figure 3:
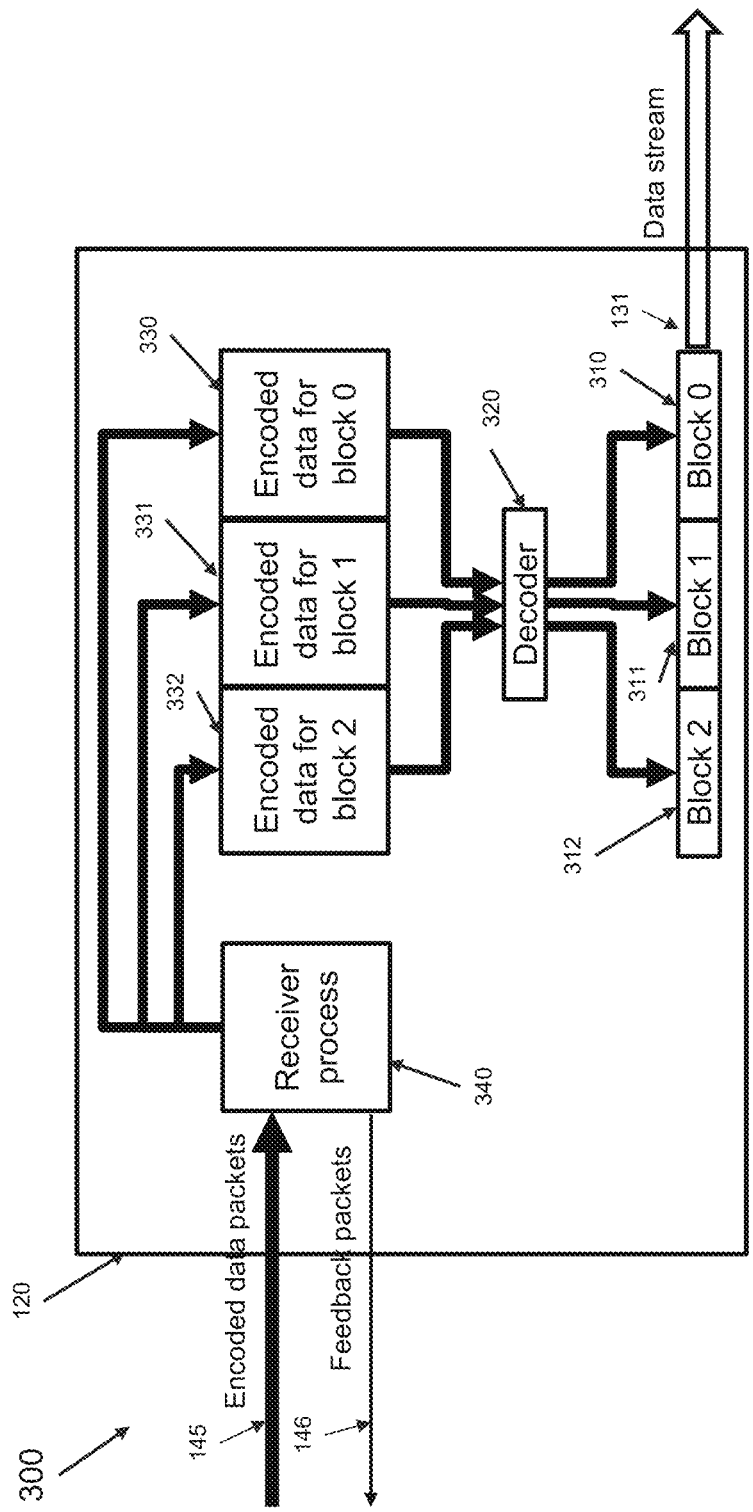
FIG. 3 is a block diagram depicting a receiving system receiving encoded packets from a sending system, providing feedback packets to the sending system, and outputting a received data stream, according to various embodiments.

FIG. 3 provides a more detailed view 300 of apparatus and methods for a receiver to receive encoded data from a sender described herein. As the packets carrying encoded data (145) arrive at a receiver (120) to the receiver process (340), the receiver saves the encoded data received for each block (330, 331, 332), and uses a decoder (320) to recover each block (310, 311, 312). Receiver process (240) is also used to determine which feedback to send in packets (146) at each point in time.

The overall methods have the property that lost packets need not be identified at the receiver and specifically requested to be retransmitted. Instead, newly generated encoded packets can be sent whenever more packets are allowed to be sent for a block, i.e., whenever the sendable number of packets for the block is greater than the number of packets already sent for the block, and a sender determines that more packets are needed. The methods are designed so that the number of encoded packets initially allowed to be sent for a block, i.e., the initial sendable number of packets for the block, is: (1) enough so that with reasonably high probability the number of these packets that arrive at the receiver enables the receiver to recover the block; (2) not much larger than the minimal number of encoded packets needed to recover the block. Property (1) ensures that the block delivery latency is minimal with reasonably high probability, whereas property (2) ensures that the amount of bandwidth used to reliably deliver the block is not much larger than the minimal amount of bandwidth possible. Using feedback from a receiver, a sender can compute how many packets the receiver received, how many are in flight to the receiver, and knowing the size of the data block, the sender can then compute or estimate the sendable number of packets for the block and use that number for determining how many repair packets to generate and send for the data block. Using feedback from the receiver, the sender can also compute loss rates for previously sent packets, compute the sendable number of packets for future blocks, and use that for computing how many repair packets to generate and send for future blocks. In some embodiments, the sender will optimize the sendable number of packets for a block based on that feedback, a block size, an expected variation in packet loss rate, etc. Where the repair packets are encoded using a rateless code (fountain code), the number of packets generated can vary from instant to instant without requiring a change of encoding scheme—the sender can just generate more or fewer packets as needed. Further, since the additional repair packets need not be retransmissions of lost packets, the sender can send some number of packets for recovery without having to be concerned about which packets were lost. This also saves on feedback traffic, as the receiver can simply send overall statistics in feedback.

A feedback packet might contain various fields in a feedback packet as might be sent from a receiver to a sender. Not all feedback packets need contain all fields and some subcombinations are described herein. For example, a feedback packet might have a field for fseqno, a feedback global packet sequence number corresponding to the largest global packet sequence number received at the receiver up to some point in time, rseqno, a feedback global packet count corresponding to the total number of packets the receiver has received up to the same point in time, and a status state indicator. Some of the feedback fields are on a block-by-block basis (e.g., a plurality of status state indicators, each status state indicator for one of a plurality of active blocks).

FIG. 4 illustrates an example table of data that might be used for transmissions. A receiver might send a feedback packet containing feedback(fs, rs, F) having a value fs for the feedback global packet sequence number fseqno, a value rs for the feedback global packet count rseqno, and a value F for a status state indicator. Feedback packets might contain values that are block-specific and/or flow-specific, the latter used where multiple flows are provided for. For example, referring to the definitions described in FIG. 5, for block i, a feedback packet might contain (fs, rs, i, $X_i$, $status_i$), where i indicates the block for which the feedback applies, feedback global packet count fs is the largest global packet sequence number received in a packet at the receiver up to some point in time t, feedback global packet count rs is the total number of packets received up to time t, feedback block packet count $X_i$ is the number of packets of encoded data the receiver has received for block i up to time t, and $status_i$ indicates the status of block i up to time t. The value of time t may also be included in the feedback packet.

The sender might have different values for fseqno and rseqno and could update its local copy accordingly. For example, if the sender receives a feedback packet with fseqno=fs while the sender has a value for fseqno that is smaller than fs, the sender can reset its value for fseqno to the fs received in the feedback packet since it is larger than the value for fseqno it had previously. Similarly, if the sender receives a feedback packet with rseqno=rs while the sender has a value for rseqno that is smaller than rs, the sender can reset its value for rseqno to the rs received in the feedback packet since it is larger than the value for rseqno it had previously.

The status state indicator might be selected from an enumerated set a set of status states {active, recoverable, recovered, abandoned, inactive}.

Methods referred to herein can provide that the feedback from the receiver to the sender can be continuous. If the receiver is not able to recover the block from the reception of encoded packets from the set of initially allowed to be sent encoded packets (the initial sendable number of packets for the block), the feedback from the receiver to the sender enables the sender to automatically increase the sendable number of packets for the block, until ultimately enough encoded packets arrive at the receiver to recover the block. For example, this can occur if packet loss conditions worsen as packets for the data block are being sent by the sender. As the feedback arrives at the sender, at each point in time the design maintains properties (1) and (2) above with respect to the sendable number of packets for the block. Thus, for each block, the methods ensure that the block delivery latency is minimal or close to minimal with very high probability and that the bandwidth used is close to minimal, while at the same time ensuring with essential certainty that blocks are recovered at the receiver.

A sender and receiver may be deployed in a device to deliver data across various types of packet-based networks.
Features As explained herein in more detail, the sender never needs to retransmit lost packets and is not required to know which packets specifically are lost. Feedback from the receiver to the sender might include counts of the number of packets (or bytes) that the receiver has received for active blocks of data. The sendable number of packets for an active block can be greater than the number of packets needed to recover the block. The sendable number of packets for the block can be automatically adjusted based on a continually updated estimate of the packet loss rate, where the estimate of the packet loss rate can be continually updated at the sender based on feedback received from the receiver. Thus, in addition to the base packets, from which all of a block can be recovered if all of the base packets is correctly received, some repair packets can be sent with the base packets and, based on additional feedback, some additional repair packets may be sent. The sendable number of packets for a block can be a function of the block size and an estimate of the packet loss rate.

The sender might include a global packet sequence number in the packet header of each sent packet that represents a sequence number that starts at zero and increases by one in each subsequently sent packet independent of for which block that packet is sent. The receiver can send feedback to the sender that includes a feedback global packet sequence number and corresponding feedback global packet count determined at some point in time t at the receiver. The time, t, may also be included in the feedback. This feedback can be used by the sender to estimate the packet loss rate. This feedback can also be used by the sender to determine how many sent packets should have arrived for each block at the receiver by the time the receiver sent the feedback if there were no packet loss. This, together with the feedback on the number of packets the receiver has received for each active block, in the form of a feedback block packet count for each active block perhaps, enables the sender to determine the number of sent packets for each block that have been lost by the time the receiver sent the feedback, which enables the sender to update the sendable number of packets for each active block.

The sender can sometimes send packets carrying no data. This is useful to trigger feedback from the receiver when many or all the sent packets carrying data for blocks have been lost, as this feedback avoids deadlocks in making progress on reliably delivering the blocks of data.

Implementation Details of Examples

The methods described herein can enable reliably delivering a rich stream of data from a sender to a receiver with ultra-low data delivery latency. The packets that are used to carry the data from the sender to the receiver carry a packet header and a packet payload. The packet header carries fields that identify the data, if any, carried in the packet payload. For example, the packets may be UDP packets, where the packet payload includes the IP/UDP headers together with fields described in more detail below that are specific to the methods described herein.

A data stream is scoped by a sender and a receiver, i.e., a data stream includes all the data that is streamed from a particular sender to a particular receiver, as for example identified by the IP addresses of the sender and receiver. The sender partitions the data stream into blocks on-the-fly, wherein all blocks may be the same size, or boundaries between blocks may be determined based on the portion of the data stream that becomes available at the sender for transmission over fixed intervals of time, or the boundaries between blocks may be determined at least in part based on application object boundaries within the data stream. For example, an application may explicitly provide each application object to the sender as a data block.

Sender Parameters

A block number is associated with each block, wherein the block numbers start at zero and increment by one for each subsequent block in the data stream. The block number is carried in the packet header for each packet sent for a block. Sequential numbering of blocks within a data stream allows the receiver to determine if there are blocks for which the receiver has received no packets. For example, if the receiver has received packets for blocks 0, 2, 3, 4, and 5, then the receiver can determine that all packets sent for block 1 have likely been lost. Other ways of generating block numbers may also be used, e.g., positive integers A, B, N may be shared between a sender and receiver, and the block numbers are generated according to the rule $(A \cdot i+B)$ mod N, for blocks $i=0, 1, 2, \ldots$.

A global packet sequence number is associated with each packet, wherein the global packet sequence numbers start at zero and increment by one for each subsequently sent packet in the data stream independently of for which block the packet is sent. As an example of one alternative, the global packet sequence number may start at some integer value other than zero. The global packet sequence number is carried in each packet header for each packet, independently of whether the packet payload carries any data. The sender maintains a data structure as shown in FIG. 4 for storing variables that are used in the sending process, including seqno, a value representing a global packet sequence number of the most recent packet sent by the sender, fseqno, which is the largest global sequence number feedback received at the sender from the receiver, and rseqno, which is the largest feedback global packet count received at the sender from the receiver representing a total number of packets the receiver has reported as received in feedback received at the sender.

There are several other block parameters relevant to the sender during the delivery of a data stream. For simplicity, we assume hereafter that all packet payloads that carry data carry the same amount of data. For each block i of the data stream, the sender might maintain a data structure in computer-readable memory such as that depicted in FIG. 5.

Example of Sender Process

While the block i is active, the sender is sending encoded data packets for block i. Sent packets for block i for which no feedback has yet been received from the receiver are considered in flight. A target value for the total number of packets to arrive at the receiver is set to $K_i+R_i$, where $K_i$ is the block size in units of packet payloads and $R_i$ is a predetermined additional number. Referring to FIG. 5, the sendable number of packets for block i is equal to the allowed number of packets in flight for block i plus the number, $X_i$, of packets that are known to the sender to have arrived at the receiver for block i, which is the largest feedback block packet count for block i received at the sender from the receiver. By setting the allowed number of packets in flight for block i in such a way that the expected number of these packets that arrive at the receiver is the target value minus the number of packets known to the sender to have already arrived at the receiver for block i, i.e., to the value $R_i+K_i-X_i$, where $K_i-X_i$ is the number of additional packets needed to recover block i, and $R_i$ is the number of packets expected to arrive at the receiver for block i beyond the minimal number of packets needed to recover block i, benefits are obtained. Setting the target value in this way ensures that if the actual number of packets in flight that arrive at the receiver for block i is below the expected number by at most a predetermined additional number $R_i$ then the receiver is able to recover block i from packets already in flight. $R_i$ should be set large enough to ensure block i can be recovered with high probability from packets in flight even when there are variations in packet loss, and $R_i$ should be set small enough to ensure that only a small amount of additional bandwidth is used to reliably recover block i. How the predetermined additional number $R_i$ is calculated might vary as well over time. For example, $R_i$ might be initially set to the square root of the size in packet payloads ($K_i$) of block i, and then be adjusted up or down based on feedback from the receiver. The sendable number of packets for a block can vary from block to block (and in the case of multiple flows, from flow to flow as well) and can be adjusted based on measured packet loss rates, expected packet loss rates, block size, and/or available bandwidth. Since there is an ability to encode additional packets as needed for a block, this variance can be easily handled.

Figure 6:
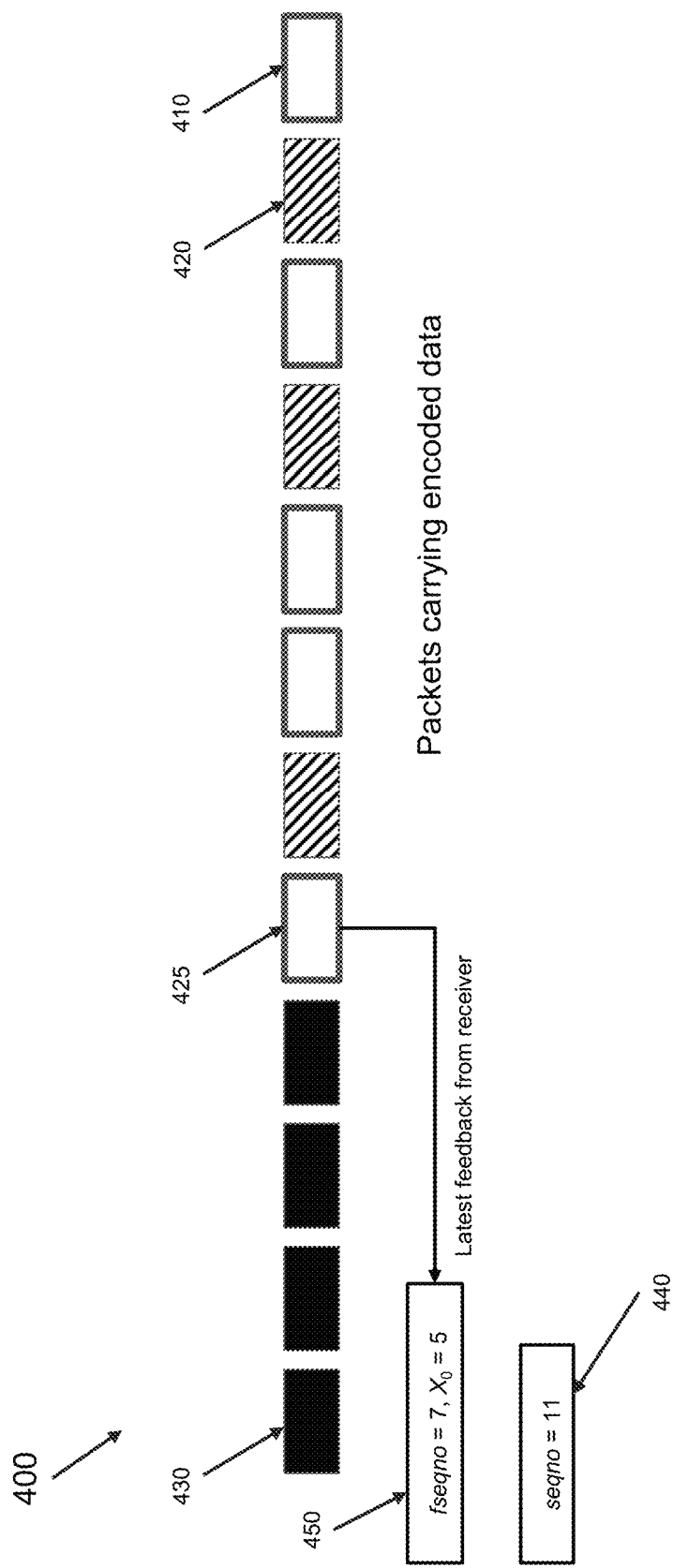
FIG. 6 illustrates a snapshot of a state of packets transmission while a sending system is sending encoded data for a block, according to various embodiments.

FIG. 6 provides a snapshot of a simple example 400 of the sender parameter values while sending encoded data for block 0. In FIG. 6, packets carrying encoded data that have arrived at the receiver by the time the receiver sent the latest feedback that has arrived at the sender are shown as rectangles with a white interior, packets carrying encoded data that have been lost before arrival at the receiver by the time the receiver sent the latest feedback that has arrived at the sender are shown as rectangles with a hatched interior, and packets carrying encoded data that are still in flight to the receiver after the time the receiver sent the latest feedback that has arrived at the sender are shown as rectangles with a black interior. For example, the first packet (410) sent by the sender has arrived at the receiver, whereas the second packet (420) sent by the sender has been lost before its arrival at the receiver. At the time of the snapshot, feedback (450) has arrived at the sender from the receiver, where the feedback 450 indicates that the number of packets received for block 0 is $X_0=5$, and that the highest sequence number in a packet at the receiver was fseqno=7, where the packet carrying fseqno=7 is packet (425). At the time of the snapshot there were four packets in flight, including the most recently sent packet (430), which carries sequence number seqno=11 (440).

From the definitions described in FIGS. 4-5, the number of packets in flight for block i is $Z_i-Y_i$. Since pest is the current estimate of the packet loss probability, the expected number of packets in flight for block i that are expected to arrive at the receiver is $(Z_i-Y_i)*(1-\text{pest})$. Since $X_i$ is the number of packets that the sender knows have arrived at the receiver for block i, and since $K_i$ is the number of packets needed to recover block i, $K_i-X_i$ is the number of packets in flight that need to arrive at the receiver to recover block i. Thus, the sendable number of packets for block i is $(K_i-X_i+R_i)/(1-\text{pest})+Y_i$, whereas the number of sent packets for block i is $Z_i$. Equivalently, the sender is allowed to send additional encoded data packets for block i if $(Z_i-Y_i)*(1-\text{pest})<K_i-X_i+R_i$. The sendable number of packets for a block can change as packets are sent for the block and feedback is received from the receiver, i.e., the values of $X_i$, $Y_i$, pest, and possibly $R_i$ can change.

Data delivery latency achieved for the methods when both $R_i$ and pest are pinned to zero during the data delivery is a lower bound on the data delivery latency for an optimal retransmission-based solution. Data delivery latency can be reduced below that of retransmission-based solutions and enable consistently small data delivery latency using the flexibility provided by allowing $R_i$ to be greater than zero and allowing pest to adjust based on the actual packet loss rate during the data delivery. The value of pest can be a global value, a per-block value, and/or a per-flow value.

Sender Methods

Two parts to the sender methods are described in this section, the sender computations for updating parameters and the sender computations for sending packets.

Figure 7:
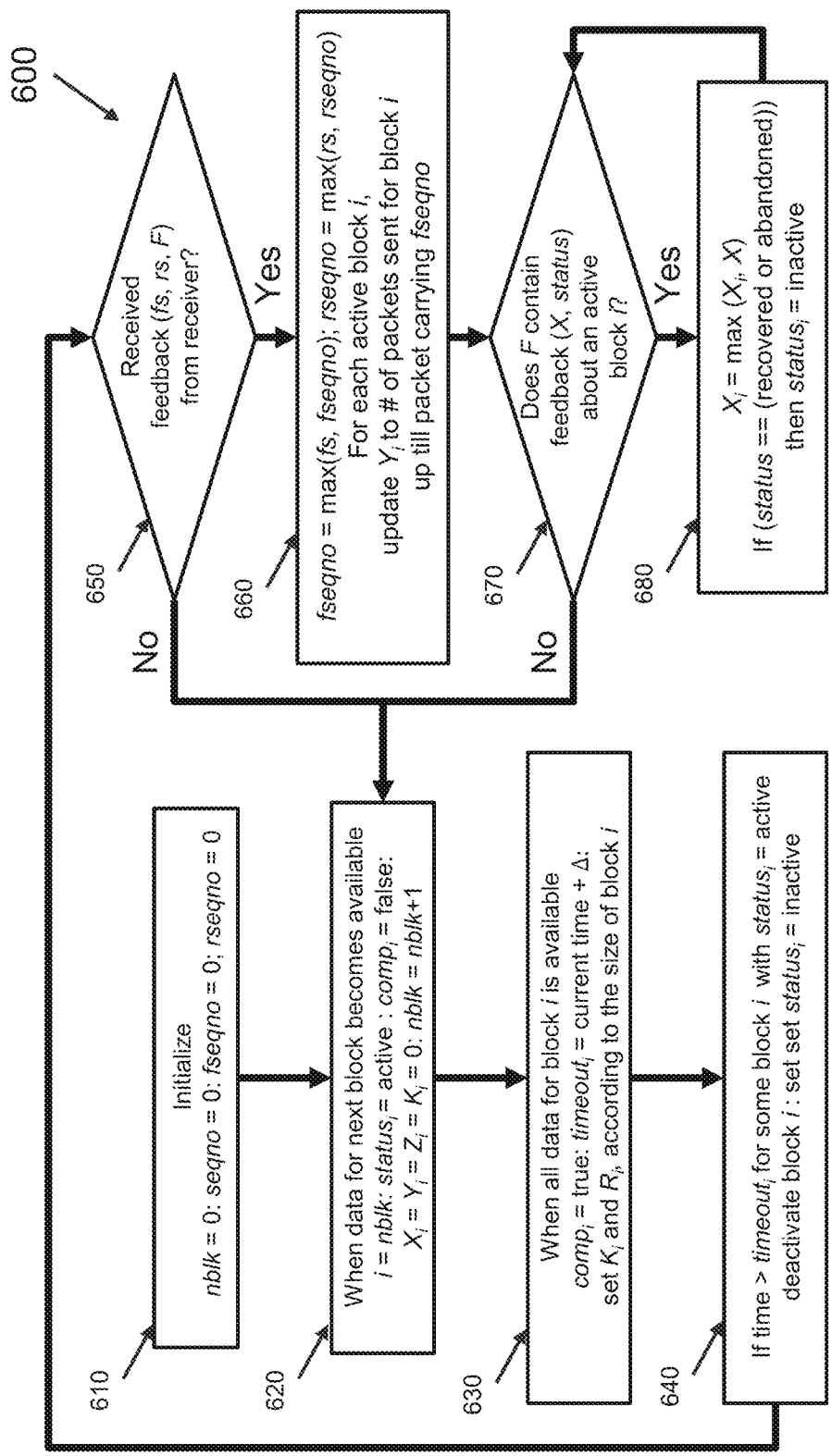
FIG. 7 illustrates a flowchart for a process usable by a sending system for updating parameters of a sending session state table and/or a block state table, according to various embodiments.

FIG. 7 describes a sender updating parameters process 600. When the sender is ready to start sending the data stream, the parameters nblk, seqno, fseqno, and rseqno are all initialized to zero (610), where nblk is the next block number to be assigned and seqno, fseqno, and rseqno are defined above. When data for next block becomes available at the sender is assigned block number i=nblk, $\text{status}_i$ is initialized to active, $\text{comp}_i$ is initialized to false, and $X_i$, $Y_i$, $Z_i$, and $K_i$ are all initialized to zero, where these parameters are defined above (620). Then, nblk is incremented by one to prepare for the next block (620). When all data for block i is available, $\text{comp}_i$ is set to true, $K_i$ and $R_i$ are set based on the size of block i, and $\text{timeout}_i$ is set to $\Delta$ plus the current time (630). The value of $\Delta$ is a time duration after which the sender will cease to send data for block i if block i has not been successfully delivered to the receiver. The value of $\Delta$ is typically set to a much longer duration than the timeout value at the receiver. In particular, if the current time is greater than $\text{timeout}_i$ for some block i with $\text{status}_i$=active then the sender deactivates block i and sets $\text{status}_i$ to inactive (640).

If the sender receives feedback (fs, rs, F) from the receiver (650), the sender resets fseqno to the maximum of fs and fseqno, and resets rseqno to the maximum of rs and rseqno, where fs is a feedback global packet sequence number and rs is a corresponding feedback global packet count (660). Furthermore, for each active block i, the sender updates $Y_i$ to the number of packets it has sent for block i up till packet carrying fseqno (660). If F contains feedback (X, status) about active block i (670) then the sender resets $X_i$ to the maximum of X and $X_i$, where X is a feedback block packet count for block i, and if status is equal to either recovered or abandoned then $\text{status}_i$ is reset to inactive (680).

Figure 8:
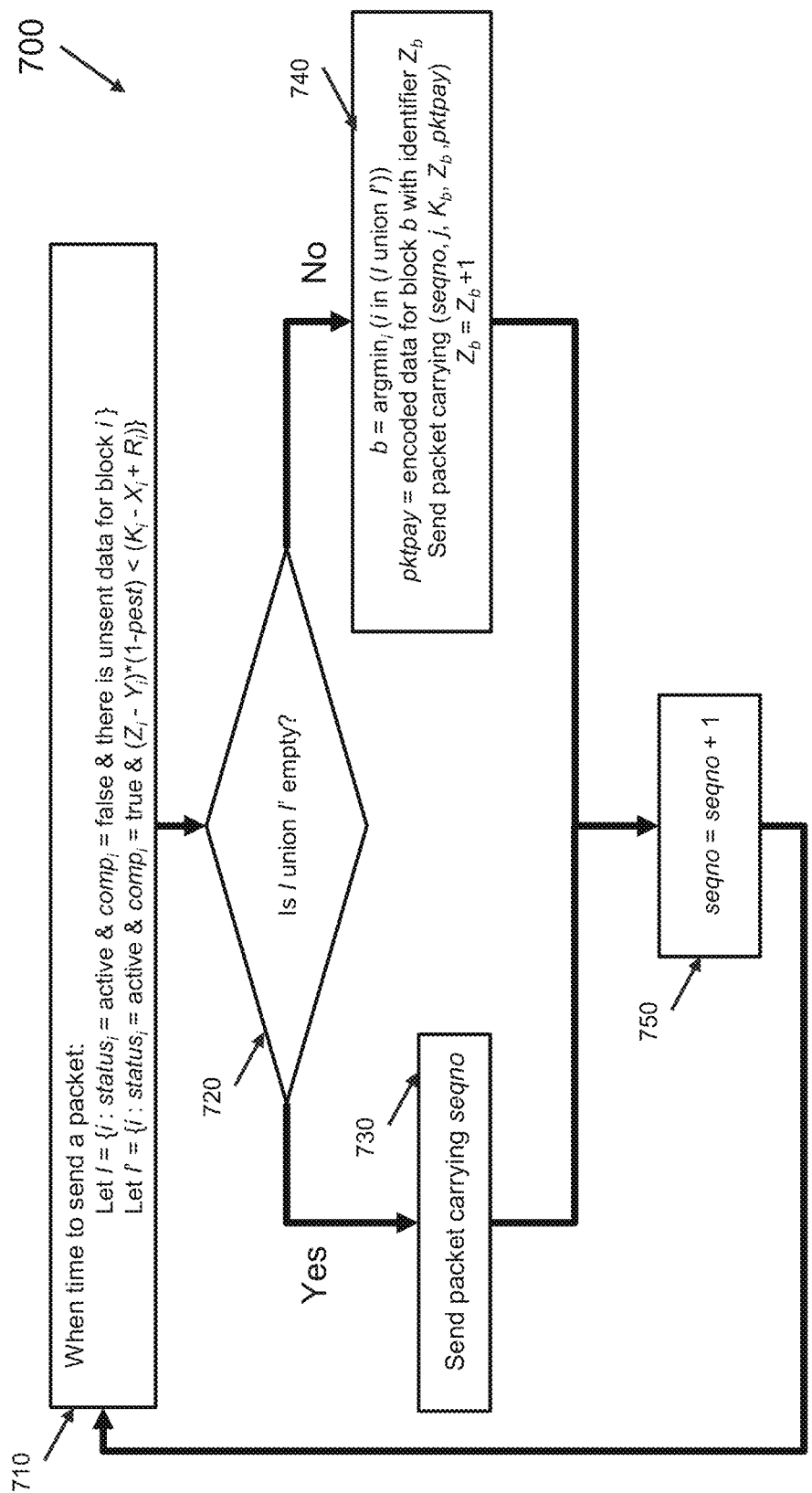
FIG. 8 illustrates a flowchart for a process usable by sending system for sending packets into a channel for a receiver, according to various embodiments.

FIG. 8 illustrates a sender sending packets process 700. When it is time for the sender to send a next packet, the sender proceeds as follows (710). Let I be the set of block numbers i such that $\text{status}_i$ is active and $\text{comp}_i$ is false and there is unsent data for block I (710). Let I' be the set of block numbers i such that i such that $\text{status}_i$ is active and $\text{comp}_i$ is true and $(Z_i-Y_i)*(1-\text{pest})<K_i-X_i+R_i$ (710). The union of I and I' are the block numbers of the blocks for which it is allowed to send a next encoded packet at this time.

If the union of I and I' is empty (720) then the sender sends a packet carrying global sequence number seqno with no data in the packet payload (730), and seqno is incremented by one to prepare for sending the next packet (750). Even though there is no data to send from any of the blocks, this packet is sent because it can trigger useful feedback from the receiver.

If the union of I and I' is not empty (720) then let b be the smallest block number in the union of I and I' (740). The next packet sent will carry encoded data for block number b. The packet header for the packet carries global sequence number seqno, block identifier b, block size $K_b$, and encoding identifier $Z_b$, and the packet payload carries the encoded data identified by encoding identifier $Z_b$ generated from block b (740). This packet is sent, $Z_b$ is incremented by one to prepare for sending the next packet for block b (740), and global sequence number seqno is incremented by one to prepare for sending the next packet (750).

As an alternative embodiment, block i may be made available to the sender together with a delivery deadline $d_i$, where the ordering of the deadlines for blocks may not coincide with the sequencing of blocks, e.g., the deadline $d_b$ for delivering block b may precede the deadline $d_i$ for delivering block i even though b is larger than i, i.e., even though block b started arriving to the sender after block i started arriving to the sender. In this embodiment, if the union of I and I' is not empty then let b be the block number in the union of I and I' such that block b has the earliest delivery deadline among all blocks in the union of I and I'. The next packet sent will carry encoded data for block number b.

Receiver Methods

Figure 9:
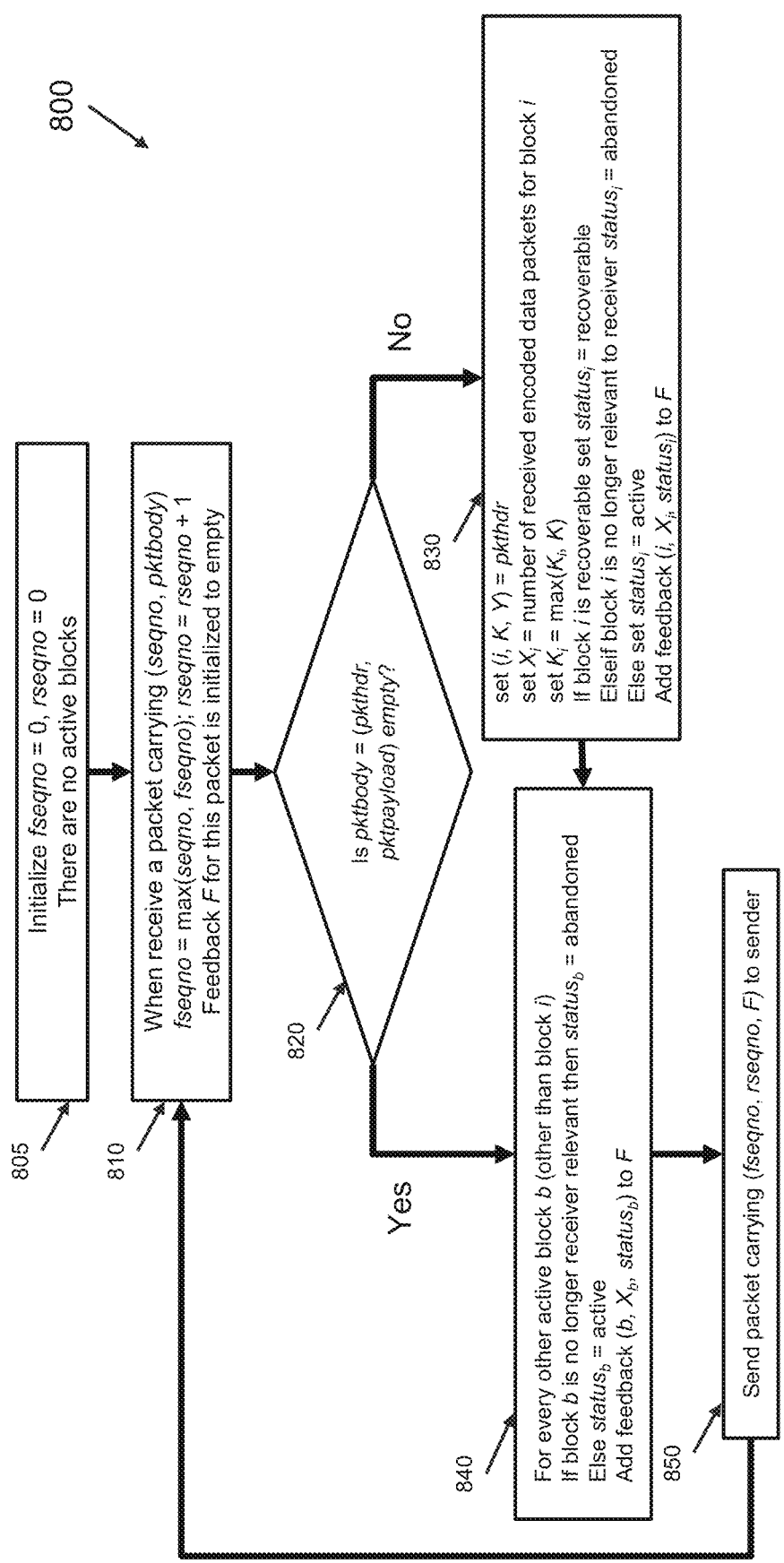
FIG. 9 illustrates a flowchart for a process usable by a receiving system for receiving packets from a sending system via a channel, according to various embodiments.

FIG. 9 illustrates an example receiver receiving packets process 800. Before receiving any packets for the data stream the receiver initializes fseqno and rseqno to zero, and there are no active blocks at the receiver (805). When the receiver receives a packet carrying a global packet sequence number seqno in the packet header then the receiver updates fseqno to the maximum of seqno and fseqno, and increments rseqno by one (810). The feedback F for this packet is initialized to empty (810).

If the received packet carries encoded data for a block (820), then the packet header carries i, K, and Y, where i is the block number, K is either zero (if the block was not complete when this packet was sent) or the size of block i in units of packet payloads (if the block was complete when this packet was sent), and Y is the encoding identifier that identifies the encoded data carried in the packet payload generated from block i (830). The receiver sets feedback block packet count $X_i$ to the total number of packets it has received so far with encoded data for block i with different encoding identifiers (including encoding identifier Y) and sets the block size $K_i$ to the maximum of K and $K_i$ (830). If block i is recoverable from the encoded data received so far, then the receiver sets $status_i$ to recoverable (830). Block i is usually recoverable if $X_i$ is at least $K_i$ and $K_i$ is greater than zero indicating $K_i$ is the size of block i in units of packet payloads. If block i is not yet recoverable then the receiver sets $status_i$ to active unless block i is no longer relevant to the receiver in which case the receiver sets $status_i$ to abandoned (830). The receiver adds the feedback (i, $X_i$, $status_i$) to F (830).

The receiver does the following for every block b that is active at the receiver, apart from block i if the received packet carries encoded data (840). If block b is no longer relevant to the receiver, then $status_b$ is set to abandoned, and otherwise $status_b$ is still active (840). The feedback (b, $X_b$, $status_b$) is added to F (840).

The receiver sends a feedback packet carrying (fseqno, rseqno, F) to the sender, where fseqno is a feedback global packet sequence number and rseqno is a corresponding feedback global packet count (850). The receiver can also include its own sequence number in the packet header of each feedback packet it sends to the sender so that if feedback packets arrive out of order to the sender, then the sender can determine based on this sequence number which is the latest feedback from the receiver.

In a particular embodiment, two types of feedback could be included in each feedback packet: block information and sequence information. Block information might comprise, for each active block, the block status, including how many encoded packets have been received for the block up through the packet with the largest global packet sequence number included in the sequence information. Sequence information might comprise, for some subset of packets previously received from the sender, the global packet sequence number of the packet and the total number of previously received packets up through the time the packet is received. The packet with highest global packet sequence number received so far by the receiver might be included in the subset of packets previously received from the sender.

Table 1 illustrates an example of sequence information that might be included in a feedback packet. In this example, the sequence information corresponds to a state in which the receiver received the sequences of packets where fs is the global packet sequence number in a received packet up to some point in time and rs is the global packet count up to the same point in time, i.e., rs is the total number of packets the receiver has received up through the packet that has the global packet sequence number fs.

TABLE 1

| Feedback Packet Contents | |
|---|---|
| fs | rs |
| 23 | 19 |
| 24 | 20 |
| 25 | 21 |
| 40 | 22 |
| 43 | 23 |
| 44 | 24 |
| 45 | 25 |
| 47 | 26 |
| 49 | 27 |
| 50 | 28 |
| 51 | 29 |

TABLE 1-continued

| Feedback Packet Contents | |
|---|---|
| fs | rs |
| 52 | 30 |
| 53 | 31 |

As a first example, the sequence information included in one feedback packet could list all of these (fs, rs) pairs, where fs is a feedback global packet sequence number and rs is a corresponding feedback global packet count, which would provide the sender with a verbose description of the entire pattern of recent packet loss. As a second example, the sequence information in a feedback packet could list the following subset of these (fs, rs) pairs: (23, 19), (25, 21), (40, 22), (49, 27), (53, 31). This second example of sequence information is more succinct than the first example and provides most of the details of the packet loss patterns, i.e., it provides the information that there is no packet loss between fs=23 and fs=25, there is a burst loss of 14 packets between fs=25 and fs=40, it condenses the exact pattern of loss between fs=40 and fs=49 such that the sender can infer that four out of the nine packets were lost, albeit not necessarily indicating which four of the nine were lost, and that there is no packet loss between fs=49 and fs=53.

With this sequence information format for feedback packets, the same (fs, rs) pair can be repeated in multiple feedback packets, which for example allows the feedback to be more robust when there is packet loss in the path between the receiver and the sender. For example, a sparse subset of previously sent (fs, rs) pairs can be sent in the current feedback packet, ensuring that even if previous feedback packets are lost and only the current feedback packet is received by the sender, then the sender at least has a coarse idea of previous packet loss patterns. For example, the sequence information included in a feedback packet could include half of the (fs, rs) pairs sent in the previous feedback packet together with some new (fs, rs) pairs corresponding to packets that have arrived at the receiver since the previous feedback packet was sent. Updates to previously sent (fs, rs) pairs can also be provided, e.g., if some packets arrive out of order at the receiver then the sequence information in a first feedback packet may contain an (fs, rs) pair and the sequence information in a subsequently sent feedback packet may contain an (fs, rs') pair where rs' is greater than rs, which can happen if packets sent from the sender to the receiver arrive out of order at the receiver. An advantage of this sequence information format is that if some feedback packets are lost, the sender can still obtain a rough approximation of packet loss from subsequent feedback packets.

There can be many variations of the above methods. For example, the sequence feedback could include a global packet sequence number fs together with the number of packets received with consecutively smaller global packet sequence numbers, e.g., the feedback pair (25, 10) could indicate that the data packets with global packet sequence numbers 16, 17, 18, 19, 20, 21, 22, 23, 24, 25 were received by the receiver. Another alternative is to include a global packet sequence number together with a bitmap of received packets with smaller global packet sequence numbers, e.g., the feedback (25, 1011001101) could indicate that the data packets with global packet sequence numbers 16, 18, 19, 22, 23, were received by the receiver and that the data packets with global packet sequence numbers 17, 20, 21, 24 were not received by the receiver. Including different types of feedback in the same feedback packet is another alternative, e.g., (type=1, 25, 10), (type=2, 11011011) could be included in the same feedback packet, where type=1 indicates a sequence number followed by a consecutive count of how many previous data packets were received, and type=2 indicates a sequence number followed by a bitmap of sequence numbers of previously received data packets.

The sender may indicate the frequency of feedback required for example by indicating to the receiver a pair (X, Y), where X indicates that the that there should be at most X data packets received at the receiver before sending the next feedback packet to the sender, and Y indicates that the delay between consecutive feedback packets sent from the receiver to the sender should be at most Y milliseconds. For example, instead of sending a feedback packet in response to each received packet, the receiver may send feedback less or more frequently, e.g., the receiver sends feedback for each third received packet, or the receiver sends a feedback packet for each 5 ms that passes, or the receiver sends a feedback packet for each fifth received packet and whenever 10 ms has passed. The amount and frequency of feedback from the receiver to the sender may also be application specific, i.e., the receiving system might be programmed to have feedback that depends on overall delivery latency requirements of an application. For example, if a first application requires 10 ms delivery latency whereas a second application requires only 100 ms delivery latency, then the frequency of feedback for the first application may be set to be much higher than for the second application.

In some cases, the feedback may be very infrequent compared to the number of packets sent from the sender to the receiver. For example, there may be a 10 Gbps stream of data sent from the sender to the receiver, which equates to around 1 million packets a second when using a typical sized UDP data packet of around 10,000 bits in size. In this case, there may be only a feedback packet each 10 ms, which is around 100 feedback packets per second, i.e., there is only one feedback packet sent for each 10,000 data packets sent. Typically, feedback packets are shorter than data packets, and thus the amount of bandwidth required between receiver and sender for feedback is a small fraction of the amount of bandwidth required between the sender and receiver for data.

The sender may send a message to the receiver to signal that the receiver should send more feedback or send less feedback, based on packet loss of feedback packets sent from the receiver to the sender. For example, if the sender is experiencing higher feedback packet loss, the sender may indicate to the receiver to increase the frequency and redundancy of information provided in the feedback to increase the reliability and accuracy of the feedback at the sender, whereas if the feedback packet loss is lower than the sender may indicate to the receiver to reduce the frequency and redundancy of information provided in the feedback to reduce bandwidth consumption between the receiver and sender.

Automatic Calculation of Parameters at Sender

In an embodiment, the sender sets $R_i$ to the square root of $K_i$ for block i, where $K_i$ is the size of block i in units of packet payloads. In other embodiments, the sender may set $R_i$ to a constant c times the square root of $K_i$ for block i, where c is greater than zero, e.g., c is equal to 0.5 or c is equal to 1.5. Larger values of c provide higher assurance of small data delivery latency at the expense of more bandwidth consumption, whereas smaller values of c provide lower assurance of small data delivery latency while saving on bandwidth consumption.

In another embodiment, the sender sets $R_i$ to the square root of seqno−fseqno at the time block i becomes available at the sender. In other embodiments, the sender may set $R_i$ to a constant c times the square root of seqno−fseqno for block i, where c is greater than zero, e.g., c is equal to 0.5 or c is equal to 1.5.

The value of pest can be initialized to some value prior to sending any packets for the data stream, e.g., pest might be set to zero if the expected packet loss rates are typically low or unknown, and pest might be set to a value alpha greater than zero if there is some a priori information suggesting that the typical packet loss rates are close to alpha, or if there is a requirement to have higher assurance of small data delivery latency at the beginning of the data stream.

In a first embodiment, the sender continually updates pest as follows. Let numflt be the current number of packets in flight for all data blocks, i.e., the sender sets numflt to seqno minus fseqno at each point in time, where seqno is the global packet sequence number in the most recent packet sent by the sender, and fseqno is the largest feedback global packet sequence number the sender has received from the receiver in feedback. Let rseqno be the feedback global packet count corresponding to fseqno. Let fseqno' be the second largest global packet sequence number the sender has received from the receiver in feedback and let rseqno' be feedback global packet count corresponding to fseqno'. Then, upon receiving the feedback from the receiver (fseqno, rseqno), the sender updates pest as indicated in Equation 1, where ds is equal to fseqno minus fseqno', dr is equal to rseqno minus rseqno', and dl is equal to ds minus dr.

$$\left(1 - \frac{ds}{numflt + ds}\right) \cdot \text{pest} + \frac{dl}{numflt + ds} \qquad \text{(Eqn. 1)}$$

The value of ds is the number of additional packets reported as sent between the last feedback report and the current feedback report from the receiver, the value of dr is the number of additional packets reported as being received between the last feedback report and the current feedback report from the receiver, and thus the value of dl is the number of additional packets calculated as being lost between the last feedback report and the current feedback report from the receiver.

In second embodiment, pest is updated as follows. Let pprev be the estimate of pest described in the first embodiment at the time in the past when the packet being sent was pseqno=seqno−numflt and let pcur be the estimate of pest described in the first embodiment at the current time when the packet just sent was seqno. Let pwin=(e·pcur—pprev)/(e−1) where e=2.71828 . . . (the natural number). The value of pwin can viewed as a more accurate estimate of the loss rate over just the past numflt packets for which feedback has been received, instead of over all previous feedback. Then, pest is set to the maximum of pcur and pwin.

In a third embodiment, pest is updated as follows. Let Kavg be the average number of packets in blocks of data that are being sent. Then, upon receiving the feedback from the receiver (fseqno, rseqno), the sender updates pest as indicated in Equation 2, where ds and dl are defined as in the first embodiment.

$$\left(1 - \frac{ds}{Kavg + ds}\right) \cdot \text{pest} + \frac{dl}{Kavg + ds} \qquad \text{(Eqn. 2)}$$

In a fourth embodiment, pest is updated as follows. Let pprev be the estimate of pest described in the third embodiment at the time in the past when the packet being sent was pseqno=seqno−Kavg and let pcur be the estimate of pest described in the third embodiment at the current time when the packet just sent was seqno. Let pwin be as defined above, and the value of pwin can viewed as a more accurate estimate of the loss rate over just the past Kavg packets for which feedback has been received, instead of over all previous feedback. Then, pest is set to the maximum of pcur and pwin.

The methods above to calculate pest can be extended when the sequence information in a feedback packet includes multiple pairs (fseqno$_1$, rseqno$_1$), (fseqno$_2$, rseqno$_2$), . . . , (fseqno$_j$, rseqno$_j$), where fseqno$_1$<fseqno$_2$< . . . <fseqno$_j$. For example, suppose the sender receives such a feedback packet at the time when the sender has just sent the packet with global packet sequence number seqno, and (fseqno$_0$, rseqno$_0$) is a pair in a previously received feedback packet, fseqno$_0$ is the largest value in such a previously received pair, and fseqno$_0$<fseqno$_1$. The sender can then apply the methods described above for updating pest by updating, for each i=1, . . . , j, the value of pest with respect to larger pair (fseqno$_i$, rseqno$_i$), second larger pair (fseqno$_{i-1}$, rseqno$_{i-1}$) and current global packet sequence number seqno.

Multi-Flow Delivery

Multiple paths for delivering data are sometimes available between a sender and receiver, e.g., a mobile sender may be connected to multiple Mobile Network Operators (MNOs) and the sender may be able to concurrently send data to a receiver via each MNO. As another example, there are some networks that natively support multiple paths between senders and receivers, e.g., some mesh networks. In these cases, utilizing multiple paths for delivering a data stream from a sender to a receiver, wherein the sender sends a flow of a portion of the encoded packets to the receiver over each such path, can be beneficial. For example, the network characteristics of different paths, especially of paths that include wireless links along the path, can experience intermittent and long-term variations in signal quality and available bandwidth, making it difficult to reliably deliver data over a single path at a consistent rate with minimal data delivery latency. Enabling data delivery utilizing multiple flows over multiple paths can make it possible to reliably deliver data at a consistently higher rate with improved data delivery latency compared to data delivery over a single path.

There are also examples where it is advantageous for a sender to send multiple flows when there is only one path known to the sender between the sender and receiver. For example, when each flow is sent using a protocol that uses a data rate control protocol that does not scale well over large round-trip times, e.g., TCP, multiple TCP flows can be used to deliver data over a single path between the sender and receiver.

Figure 10:
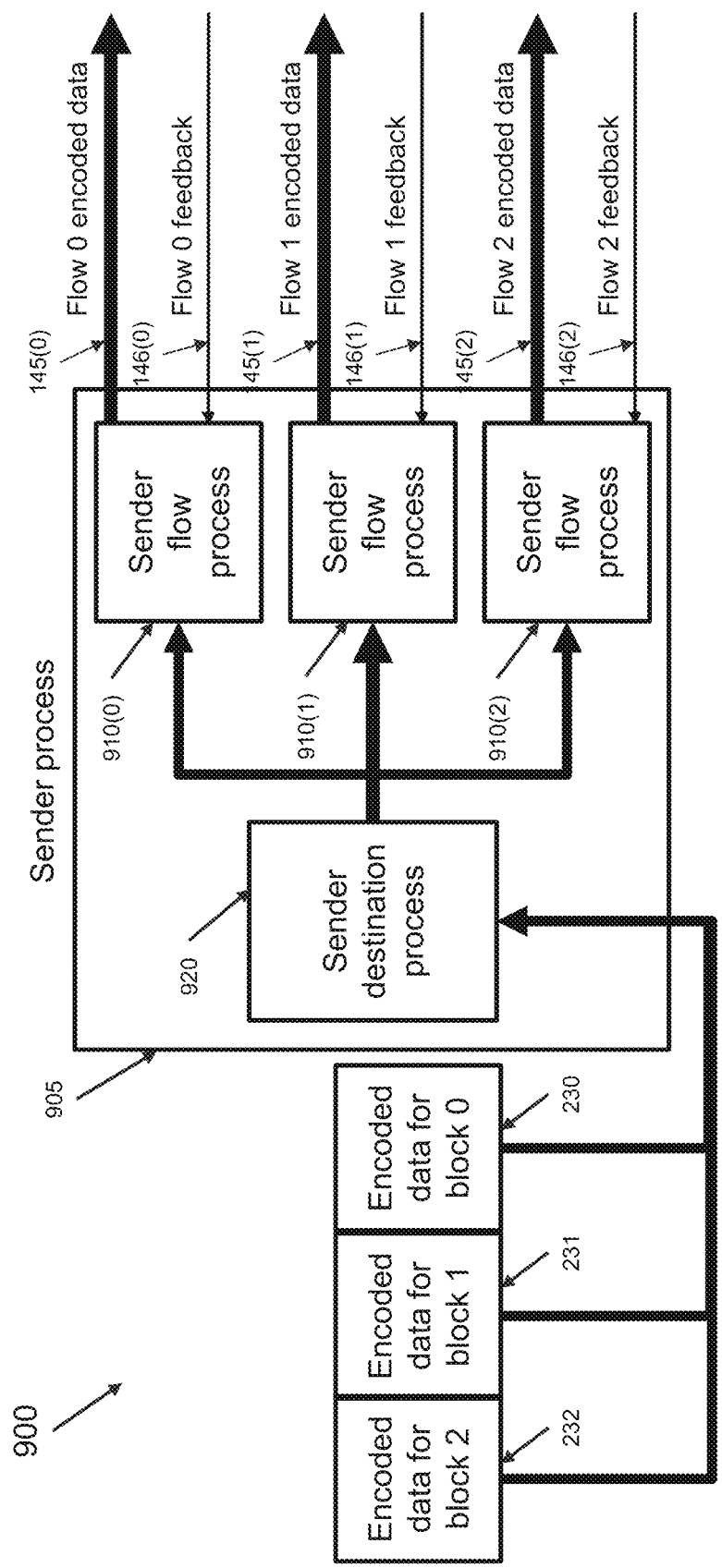
FIG. 10 illustrates a flowchart for a process usable by a sending system to process multiple flows to a receiving system, according to various embodiments.

FIG. 10 illustrates an example sender multi-flow overall process 900. The sender process unit (905) is partitioned into sender flow process units (910(0), 910(1), 910(2)) and sender destination process unit (920).

There is one sender flow process shown for each of the flows, where three flows are shown in FIG. 10. Exemplary sender flow process (910(0)) is for flow 0. Sender flow process (910(0)) generates and sends packets that include a flow identifier 0 in the packet headers to distinguish the flow from the other flows sent to the same receiver destination. Sender flow process (910(0)) initializes and manages the following parameters independently of the other sender flow processes:

For each flow, the sender might maintain a data structure in computer-readable memory such as that depicted in FIG. 12. For each flow of each block i of the data stream, the sender might maintain a data structure in computer-readable memory such as that depicted in FIG. 13.

Sender flow process (910(0)) determines when the next packet can be sent within flow 0, and when it is time to send the next packet within flow 0, sender flow process (910(0)) signals the sender destination process (920) to provide the next packet to send, sender destination process (920) provides the packet to sender flow process (910(0)), sender flow process (910(0)) adds its flow identifier 0 and seqno0 to the packet header and sends the packet within flow 0 to the receiver. Sender flow process (910(0)) receives feedback from the receiver containing feedback relevant to flow 0, i.e., fseqno0, rseqno0, and for each active block i, the values of X0$_i$, Y0$_i$, and Z0$_i$, similar to portions of the process described in FIG. 7.

Figure 11:
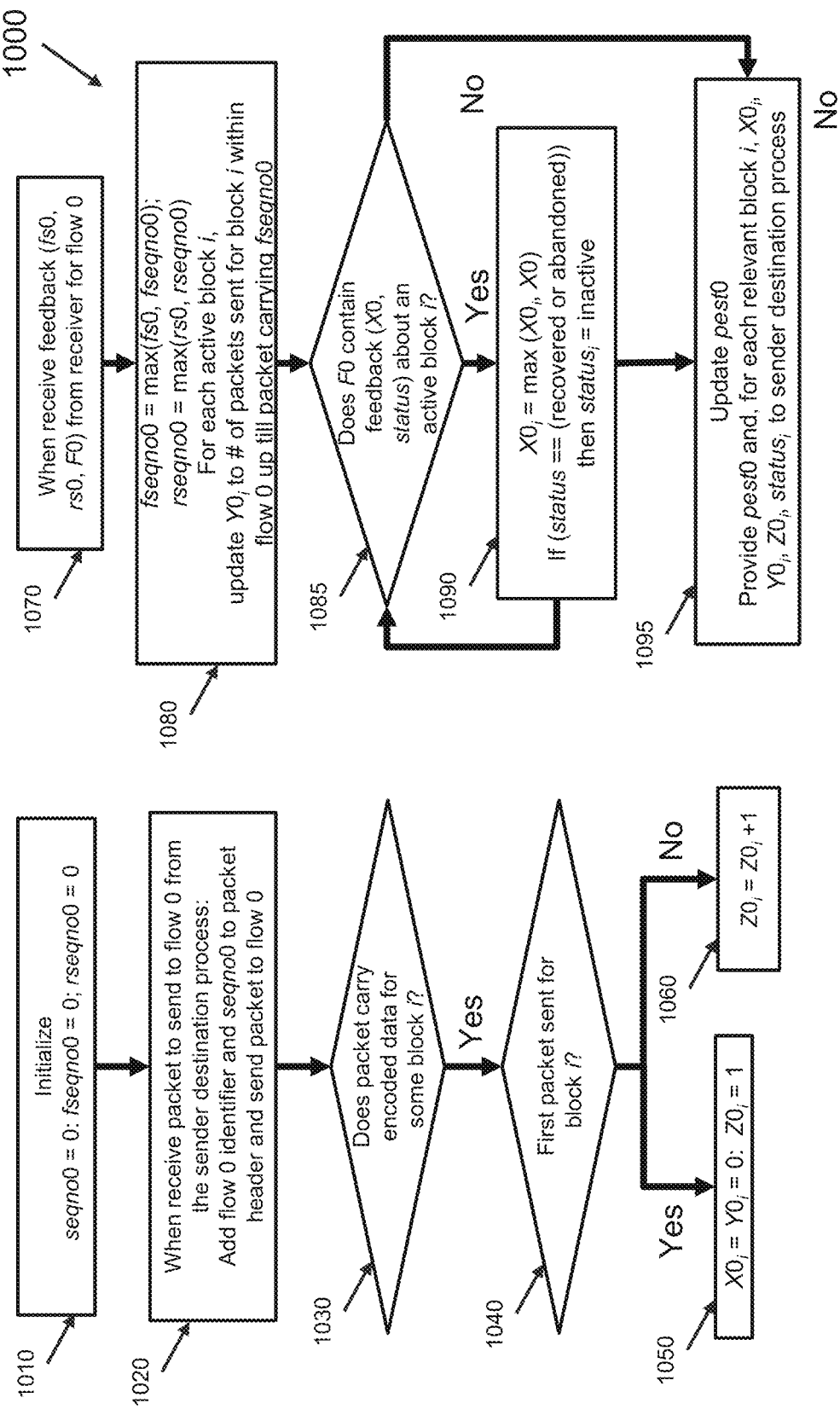
FIG. 11 illustrates a flowchart for a process usable by a sending system, according to various embodiments.

FIG. 11 provides a more detailed description 1000 of sender flow process (910(0)) for an exemplary flow 0. In an initialization step, seqno0, fseqno0 and rseqno0 are initialized to zero (1010). When sender flow process (910(0)) receives a packet to send to flow 0 from the sender destination unit (920), the flow 0 identifier and seqno0 values are added to the packet header of the packet and the packet is sent to flow 0 (1020). If the packet carries encoded data for some block i (1030) and this is the first packet sent for block i (1040) then X0 and Y0$_i$, are initialized to zero and Z0$_i$ is initialized to one (1050). If the packet carries encoded data for some block i (1030) and this is not the first packet sent for block i (1040) then Z0$_i$ is incremented by one (1060). When sender flow process (910(0)) receives feedback (fs0, rs0, F0) from the receiver for flow 0, where fs0 is a feedback global packet sequence number for flow 0 and rs0 is the corresponding feedback global packet count for flow 0 (1070), then fseqno0 is updated to the maximum of fs0 and fseqno0, rseqno0 is updated to the maximum of rs0 and rseqno0, and, for each active block i, Y0$_i$ is updated to the number of packets sent for block i carrying encoded data within flow 0 up till packet carrying fseqno0 (1080). If F0 contains feedback (X0, status) about an active block i that has not already been processed (1085), then X0$_i$ is updated to the maximum of X0, and X0$_i$ where X0 is a feedback block packet count for flow 0, and if status is either recovered or abandoned then status$_i$ is updated to inactive (1090). The value of the estimate of the packet loss probability pest0 for flow 0 is updated, and the value of pest0 and, for each relevant block i, the values of X0$_i$, Y0$_i$, Z0$_i$, and status$_i$ are provided to the sender destination unit (1095).

Figure 14:
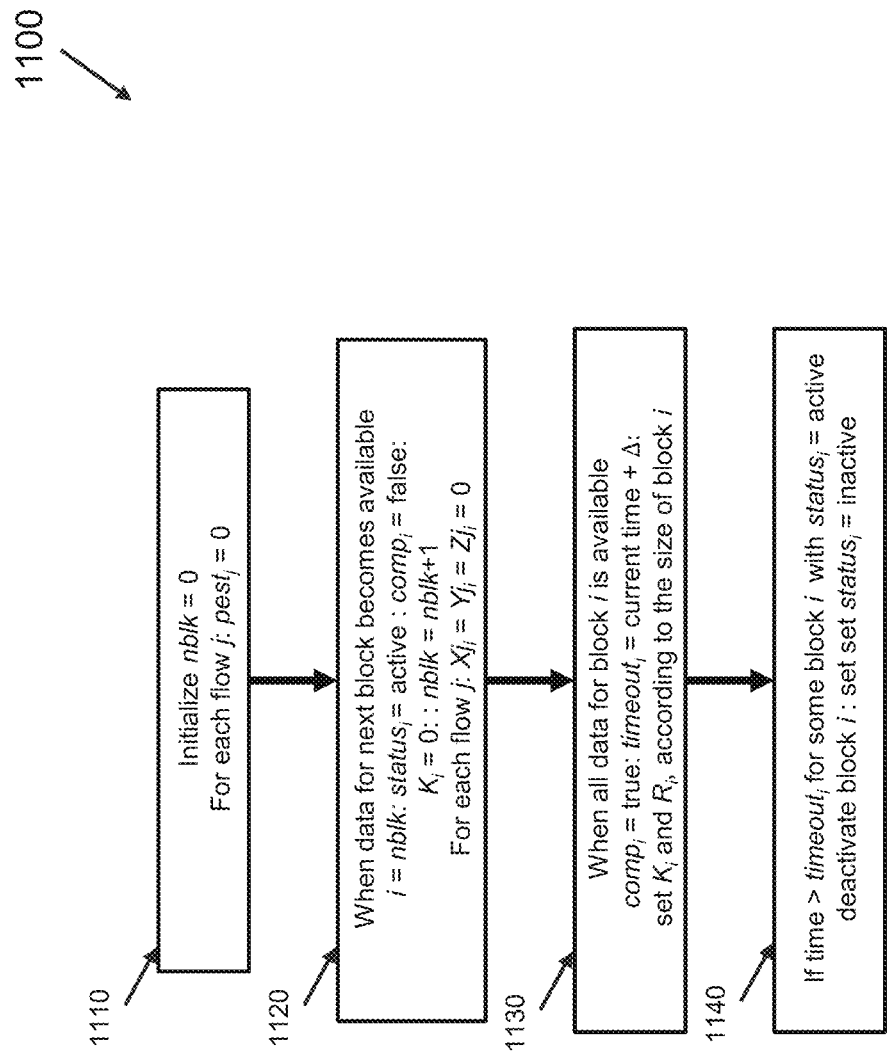
FIG. 14 illustrates a flowchart for a process usable by a receiving system for updating parameters, according to various embodiments.

FIG. 14 provides a more detailed description of sender destination process 1100 for parameter updates. The number of blocks nblk is initialized to zero and, for each flow j, the estimate of the packet loss probability pest$_j$ for flow j is initialized to zero (1110). When data for a next block becomes available to the sender destination process (920; see FIG. 10), the block number i is set to nblk, status$_i$ is set to active, comp$_i$ is set to false, K$_i$ is set to zero, and nblk is incremented by one in preparation for the arrival of the next block (1120). When all data for block i is available then comp$_i$ is set to true, timeout$_i$ is set to the current time plus an increment of time Δ, and K$_i$ and R$_i$ are set according to the size of block i (1130). If at some point the current time is beyond timeout$_i$ for block i, then block i is deactivated and status$_i$ is set to inactive (1140).

Figure 15:
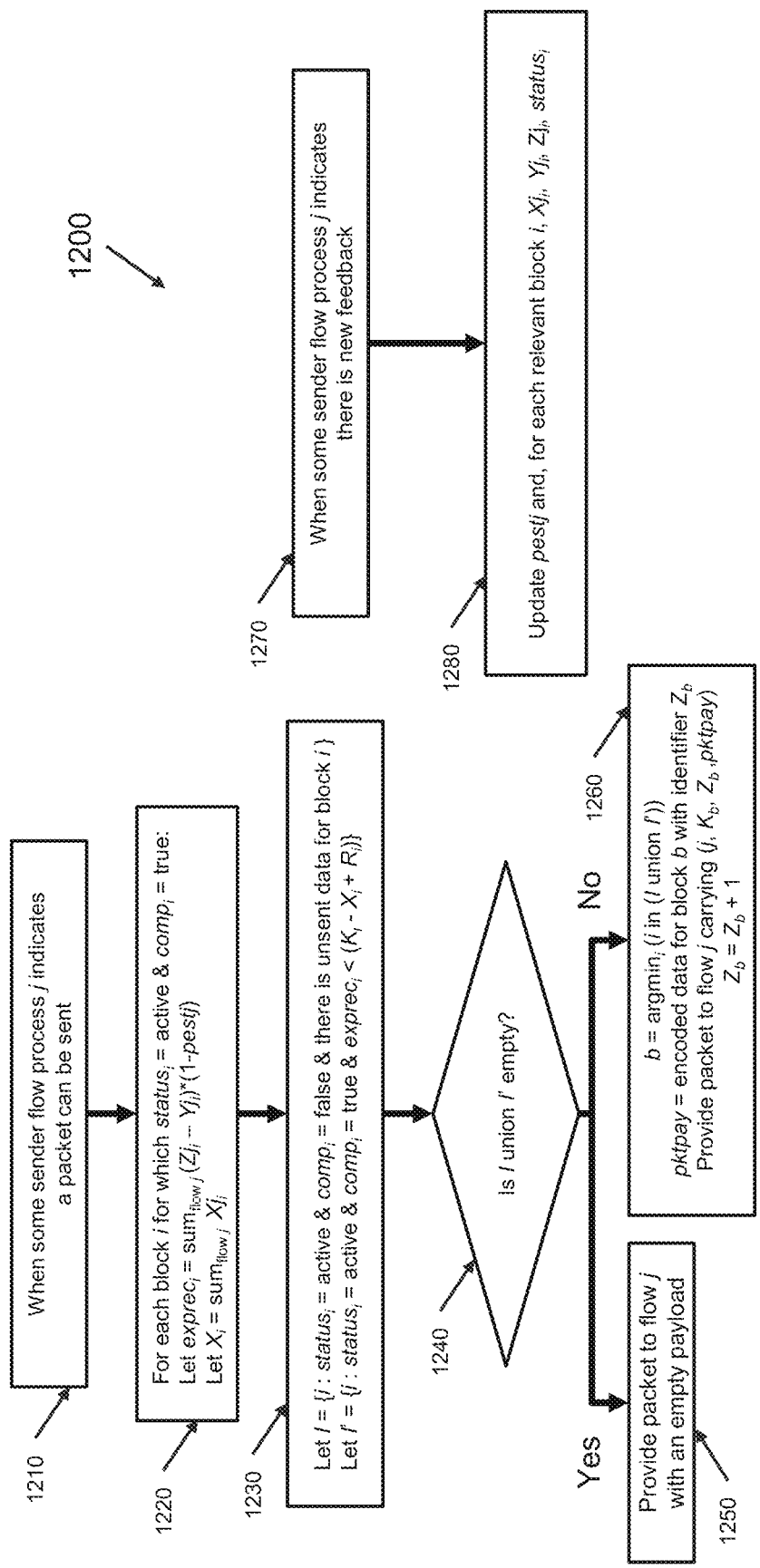
FIG. 15 illustrates a flowchart for a process usable by a sending system for processing and sending a packet and for receiving feedback, according to various embodiments.

FIG. 15 provides a more detailed description 1200 of sender destination process (920) for sending packets to flow and receiving feedback from flows. When some sender flow process j indicates a packet can be sent then the following processing is executed (1210). For each block i for which status$_i$ is active and comp is true, let exprec$_i$ be the sum over all flows j of (Zj$_i$−Yj$_i$)*(1−pest$_j$), and let X$_i$ be the sum over all flows j of Xj$_i$ (1220). The value of exprec$_i$ is an estimate of how many of the packets in flight for block i across all flows are expected to reach the receiver based on estimated packet loss probabilities for each flow, and the value of X$_i$ is the number of packets for block i across all flows that have been acknowledged in feedback as arriving at the receiver. If status$_i$ is active and comp$_i$ is true and exprec$_i$ is less than K$_i$−X$_i$+R$_i$ for block i then the sendable number of packets for block i is greater than the number of packets sent so far for block i, i.e., another packet can be sent for block i. Let I be the set of block numbers i such that status$_i$ is active and comp$_i$ is false and there is unsent data for block i and let I' be the set of block numbers i such that status is active and comp$_i$ is true and exprec$_i$ is less than K$_i$−X$_i$+R$_i$ (1230). If the union of I and I' is empty (1240) then there is no encoded data to send for any block at this point and time, and thus the packet provided to sender flow process j to send is a packet with an empty payload (1250). If the union of I and I' is not empty (1240) then let b be the minimum block number in the union of I and I', and then the packet payload pktpay for the packet is set to the encoded data for block b with encoding identifier Z$_b$, the packet header for the packet is set to (j, K$_b$, Z$_b$), the packet is provided to flow j, and encoding identifier Z$_b$ is incremented by one in preparation for sending the next packet for block b (1260). When some sender flow process j indicates that it has new feedback for the sender destination unit (1270), the estimate of the packet loss probability pest$_j$ and, for each relevant block i, the values of Xj$_i$, Yj$_i$, Zj$_i$, and status$_i$ are updated based on the feedback (1280).

There are many variants of the above methods. For example, instead of the receiver sending feedback individually for each flow to each sender flow process, e.g., to sender flow process (910(0)) for flow 0 and to sender flow process (910(1)) for flow 1 and to sender flow process (910(2)) for flow 2, the receiver may send the feedback combined for all flows to either a separate feedback process, or directly to the sender destination process (920). As another alternative, the receiver may feedback the number of packets X$_i$ it has received in aggregate for block i over all flows instead of feeding back the individual number of packets for block i received from each flow.

In another variant, a packet loss rate pest averaged over all flows may be calculated by the sender destination process (920) and used to determine whether more packets can be sent for each block i.

In another variant, the sender destination process (920) is similar to the sender process (110) depicted in FIG. 2 and described in more detail in FIGS. 7-8. One main difference in this embodiment is that the sender destination process interacts with each of the sender flow processes for each of the flows, wherein each sender flow process indicates to the sender destination process when the sender flow process is able to send another packet within its flow, and the sender destination process provides the next fully formed packet (formed according to the details described with reference to FIGS. 7-8), and the sender flow process sends this packet directly to its flow. In this variant, the feedback from the receiver is global feedback about all the packets received across all the flows, using processes very similar to those described with reference to FIG. 9, and the feedback is sent directly back to the sender destination process.

Some Simulation Results

FIGS. 16-19 illustrate results of a simulation for a stream of equal-sized blocks sent in a single flow from a sender to a receiver. The parameters of the simulation are K, BW, RTT, blks, and a varying packet loss pattern. The value of K is the size of each block in units of packet payloads.

The embodiment method used in the simulations shown in FIGS. 16-19 uses $R=\sqrt{K}$, where R is the number of additional repair packets of data that the sender can proactively send beyond the base packets for each block when there is no packet loss. The embodiment method uses the fourth embodiment for estimating pest described above in Section "Automatic calculation of parameters at sender", where pest is initialized to zero.

FIGS. 16-19 also show, for comparison, results of a retransmission-based method. The retransmission-based method sends the minimal number of packets to reliably deliver each block and delivers each block with the minimum possible block delivery latency among all methods for reliably delivering blocks based on retransmission.

Time slots are available at a regular time interval to the sender in the simulation, where at each time slot the sender can send exactly one packet. For i=0, blks−1, block i becomes available to the sender for transmission after i·BW time slots, where blks is the number of blocks delivered in the simulation and the value of BW provides a constraint on the number of time slots available to the sender to deliver each block (this is essentially a bandwidth constraint). The value of BW must be at least K, and BW needs to be larger than K when there is packet loss or when more than K packets are sent proactively for each block.

Packets sent from the sender to the receiver are lost at a packet loss rate that is varied over the duration of a simulation. There is no packet loss in the feedback from the receiver to the sender in the simulations. The value of RTT is the number of time slots between when the sender sends a packet and when feedback is received at the sender that was generated at the receiver after having received that packet or a subsequently sent packet.

FIGS. 16-19 show simulation results with respect to the setting K=5,000, BW=8,000, RTT=8,000, blks=100. In each chart shown in the figures, moving from left to right on the X-axis corresponds to the passing of time, displayed on the charts in units of block availability, where the number of time slots for sending packets between the two consecutive blocks is BW.

Figure 16:
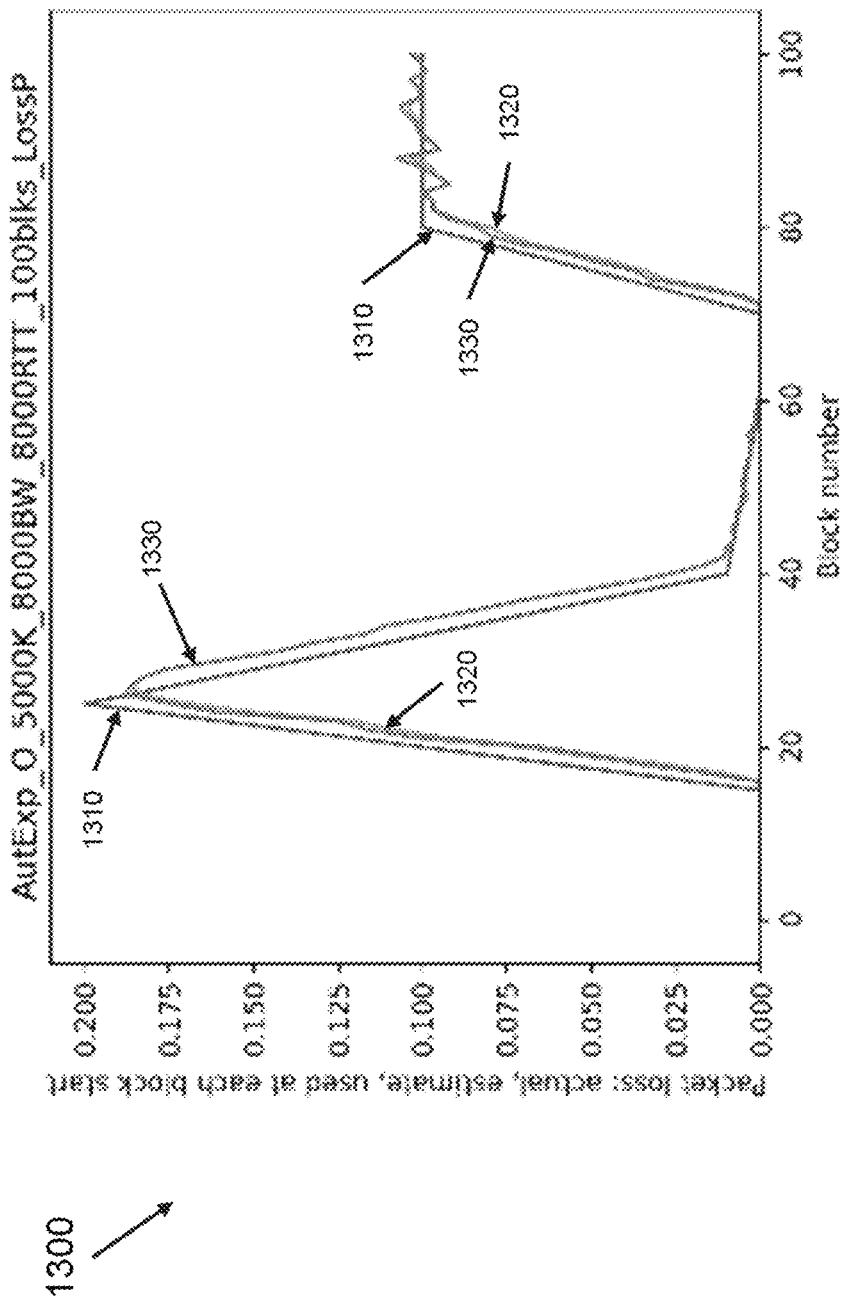
FIG. 16 is a plot of various simulation results, showing packet loss rate as a function of packet loss for blocks, according to various embodiments.

In FIG. 16, the Y-axis of plot 1300 corresponds to the packet loss rates at each point in time, where the line (1310) corresponds to the packet loss rate set in the simulation. The simulation randomly loses the packet in each time slot with its associated packet loss probability (1310), which determines which packets are delivered to the receiver. The exact same packet loss pattern is used for the embodiment method and for the retransmission-based method. The line (1320) and line (1330) correspond to the embodiment method packet loss estimates pcur and pest in the fourth embodiment described above, respectively.

Figure 17:
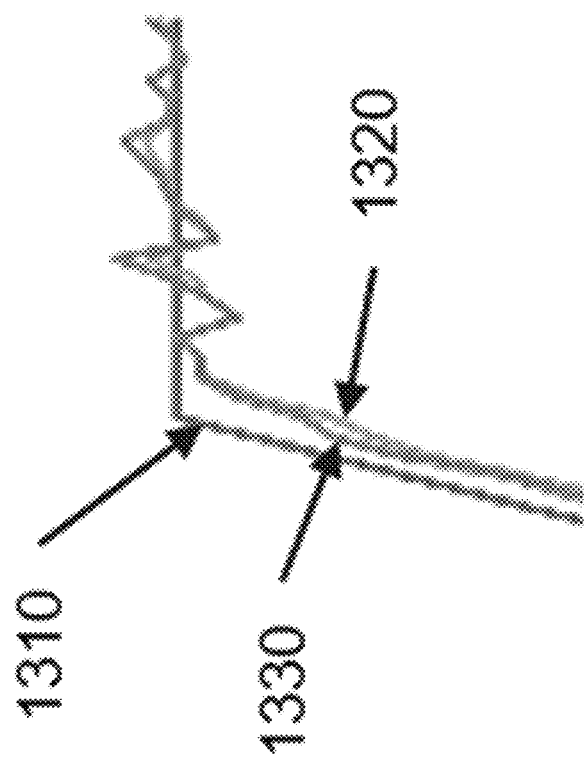
FIG. 17 illustrates a portion of the plot of FIG. 16 in greater detail.

FIG. 17 shows a magnified portion of the lines (1310, 1320, 1330) shown in FIG. 16.

Figure 18:
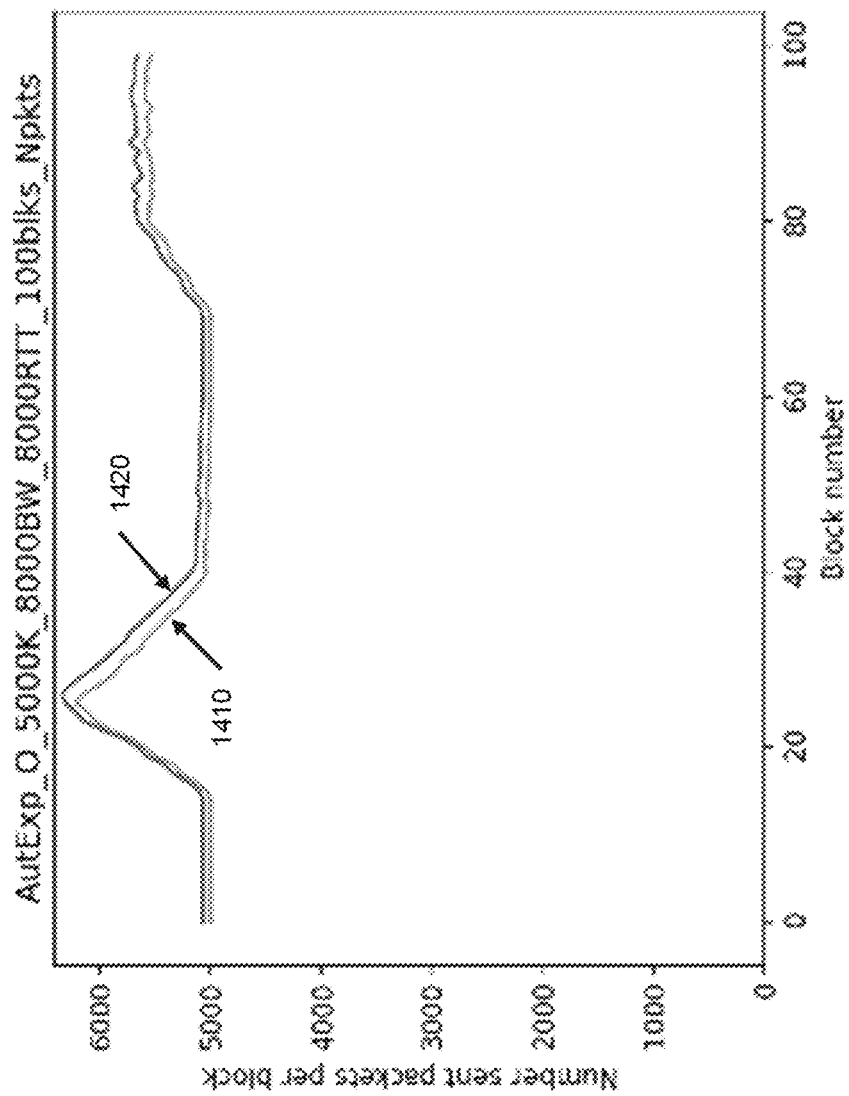
FIG. 18 is a plot of various simulation results, showing a number of packets sent per block to reliably deliver each block, according to various embodiments.

In FIG. 18, the Y-axis of plot 1400 corresponds to the number of sent packets for each block to reliably deliver each block from the sender to the receiver. The line (1410) shows the results for the retransmission-based method, whereas the line (1420) shows the results for the embodiment method.

Figure 19:
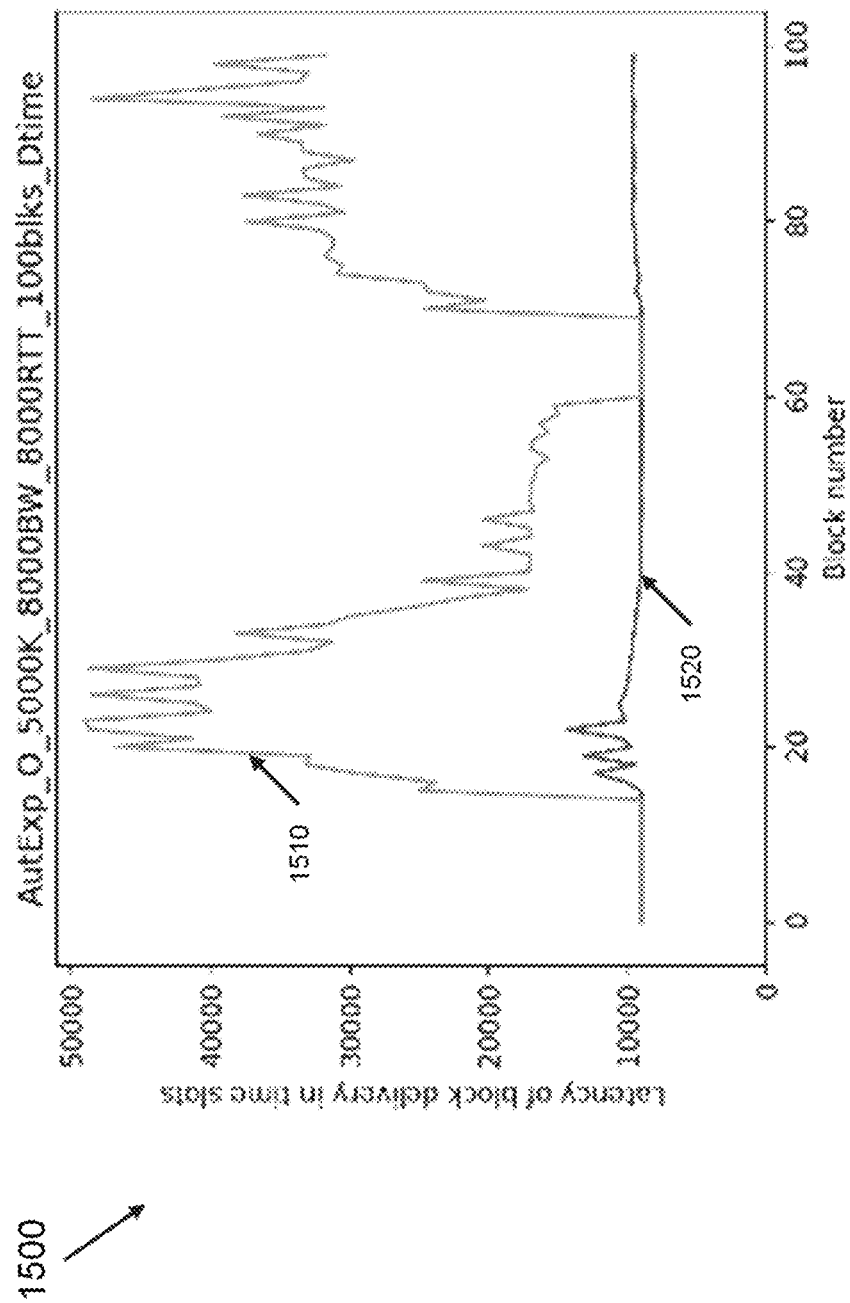
FIG. 19 is a plot of various simulation results, showing a delivery time in packet slots to reliably deliver each block, according to various embodiments.

In FIG. 19, the Y-axis of plot 1500 corresponds to the number of time slots between when a block becomes available at the sender until the block is recovered at the receiver, i.e., this shows the block delivery latency. The RTT is assumed to be evenly split between the sender to receiver data delivery path and the receiver to sender feedback path, i.e., a sent packet arrives at the receiver (if it is not lost) RTT/2 packet time slots after it is sent, and thus the minimal possible block latency delivery is K+RTT/2=9,000. The line (1510) shows the block delivery latency for the retransmission-based method, whereas the line (1520) shows the block delivery latency for the embodiment method. The minimal possible block delivery latency is achieved for the retransmission-based method and for the embodiment method when there is no packet loss, e.g., at the beginning of the simulation. However, the block delivery latency is significantly above the minimal possible block delivery latency for the retransmission-based method when there is minimal packet loss, and the block delivery latency is a large multiple of the minimal possible block delivery latency (and quite variable) as the packet loss rate grows. On the other hand, the block delivery latency consistently remains close to the minimal possible block delivery latency for the embodiment method as the packet loss rate grows.

Figure 20:
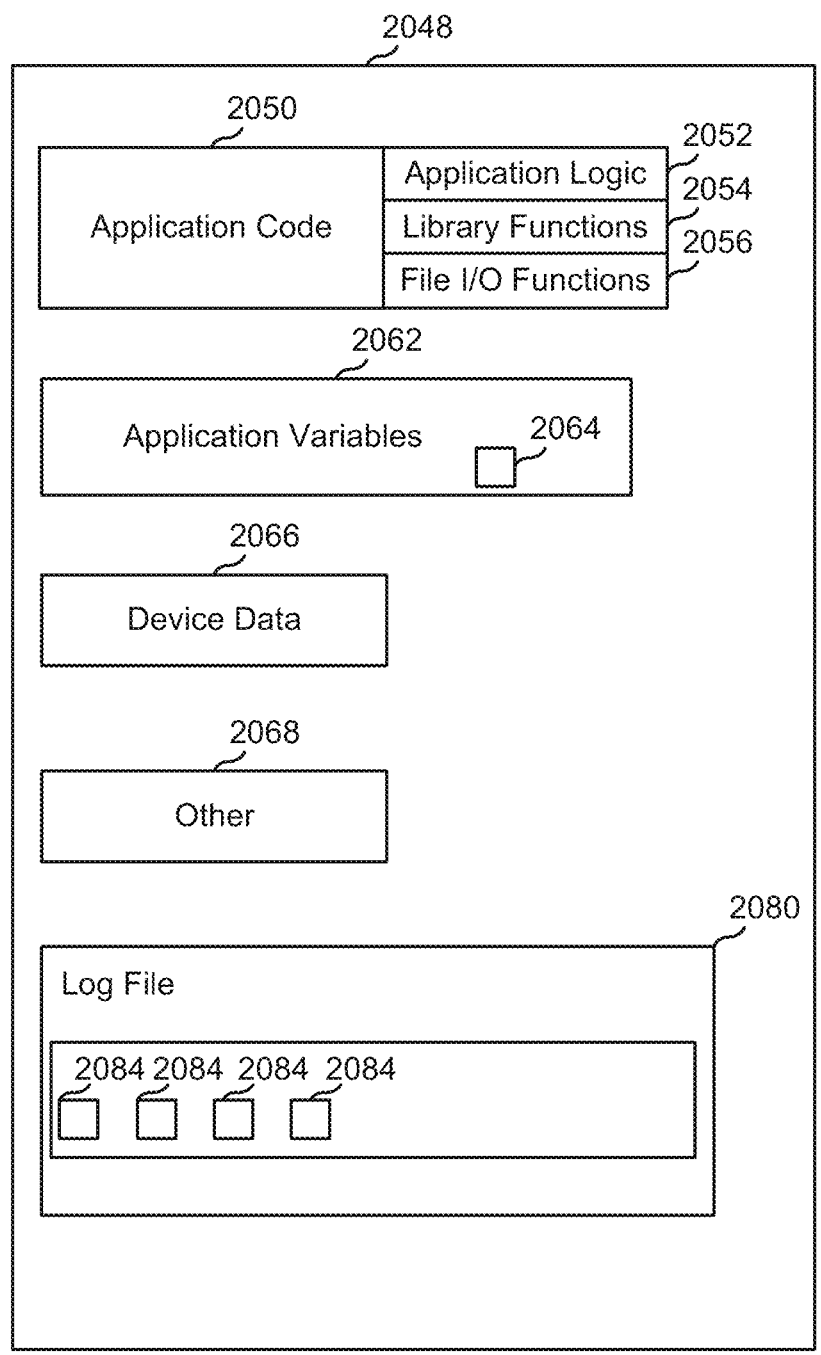
FIG. 20 illustrates an example computer system memory structure as might be used in performing methods described herein, according to various embodiments.

FIG. 20 is a simplified functional block diagram of a storage device 2048 having an application that can be accessed and executed by a processor in a computer system as might be part of embodiments of sending systems and/or receiving systems and/or a computer system that does data or signal processing. FIG. 20 also illustrates an example of memory elements that might be used by a processor to implement elements of the embodiments described herein. In some embodiments, the data structures are used by various components and tools, some of which are described in more detail herein. The data structures and program code used to operate on the data structures may be provided and/or carried by a transitory computer readable medium, e.g., a transmission medium such as in the form of a signal transmitted over a network. For example, where a functional block is referenced, it might be implemented as program code stored in memory. The application can be one or more of the applications described herein, running on servers, clients or other platforms or devices and might represent memory of one of the clients and/or servers illustrated elsewhere.

Storage device 2048 can be one or more memory device that can be accessed by a processor and storage device 2048 can have stored thereon application code 2050 that can be configured to store one or more processor readable instructions, in the form of write-only memory and/or writable memory. The application code 2050 can include application logic 2052, library functions 2054, and file I/O functions 2056 associated with the application. The memory elements of FIG. 20 might be used for a server or computer that interfaces with a user, generates data, and/or manages other aspects of a process described herein.

Storage device 2048 can also include application variables 2062 that can include one or more storage locations configured to receive input variables 2064. The application variables 2062 can include variables that are generated by the application or otherwise local to the application. The application variables 2062 can be generated, for example, from data retrieved from an external source, such as a user or an external device or application. The processor can execute the application code 2050 to generate the application variables 2062 provided to storage device 2048. Application variables 2062 might include operational details needed to perform the functions described herein.

Storage device 2048 can include storage for databases and other data described herein. One or more memory locations can be configured to store device data 2066. Device data 2066 can include data that is sourced by an external source, such as a user or an external device. Device data 2066 can include, for example, records being passed between servers prior to being transmitted or after being received. Other data 2068 might also be supplied.

Storage device 2048 can also include a log file 2080 having one or more storage locations 2084 configured to store results of the application or inputs provided to the application. For example, the log file 2080 can be configured to store a history of actions, alerts, error message and the like.

A computer system may implement the techniques described herein using customized hard-wired logic, one or more ASICs or FPGAs, firmware and/or program logic which in combination with the computer system causes or programs the computer system to be a special-purpose machine. According to one embodiment, the techniques herein are performed by a computer system in response to a processor executing one or more sequences of one or more instructions contained in memory, such as described in reference to FIG. 20. Such instructions may be read into a main memory from another storage medium, such as a storage device. Execution of the sequences of instructions contained in the main memory might cause the processor to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks. Storage media is distinct from but may be used in conjunction with transmission media. Transmission media participates in transferring information between storage media. For example, transmission media includes coaxial cables, copper wire, and fiber optics, including the wires that include a bus. Transmission media can also take the form of acoustic or light waves, such as those generated during radio-wave and infra-red data communications.

Various forms of media may be involved in carrying one or more sequences of one or more instructions to a processor for execution. For example, the instructions may initially be carried on a magnetic disk or solid-state drive of a remote computer. The remote computer can load the instructions into its dynamic memory and send the instructions over a network connection.

A method of transmitting data of a data stream reliably from a sender to a receiver, wherein reliability of transmission is indicated by a confirmation from the receiver to the sender that the data is considered received, might comprise obtaining the data of the data stream to be sent from a source device to a destination device, wherein the destination device is configured to receive data from the receiver in a presumed reliable form, organizing the data into a sequence of one or more blocks of data, each block having a block identifier associated therewith, encoding a block of the one or more blocks of data into a sequence of packets for the block, organizing data of a packet of the sequence of packets for a block into a packet header and a packet payload, wherein the packet is to be processed such that it is either received correctly at the receiver or discarded at the receiver if it cannot be determined to be entirely recovered correctly, including, in the packet header of the packet, a first indication and a second indication, wherein the first indication comprises a block size and a block identifier of a block and an encoding identifier from which the packet payload was derived and the second indication comprises a global packet sequence number that uniquely identifies the packet relative to other packets of the data stream, including, in the packet payload of the packet, encoded data derived from the block of data identified by the block size and the block identifier and the encoding identifier included in the packet header, determining a sendable number of packets for the block, sending the packet to the receiver for the block if the total number of packets sent so far from the sequence of packets for the block is less than the sendable number of packets for the block, receiving, from the receiver, a third indication of a largest global packet sequence number among packets received correctly at the receiver and a fourth indication of a total number of packets received correctly, determining, at the sender, the sendable number of packets for the block, at least in part, based on the third indication and the fourth indication, wherein packets of the sequence of packets for the block are interchangeable with packets lost from the plurality of packets of the sequence of packets for the block to recover the block.

According to some embodiments, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hardwired and/or program logic to implement the techniques.

One embodiment might include a carrier medium carrying data that includes data having been processed by the methods described herein. The carrier medium can comprise any medium suitable for carrying the data, including a storage medium, e.g., solid-state memory, an optical disk or a magnetic disk, or a transient medium, e.g., a signal carrying the data such as a signal transmitted over a network, a digital signal, a radio frequency signal, an acoustic signal, an optical signal or an electrical signal.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be provided carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method of transmitting data of an input data source from a sender to a receiver with reliability of transmission, wherein the reliability of transmission is indicated by a confirmation from the receiver to the sender that the data is considered received, the method comprising:

obtaining the data of the input data source, to be sent from a source device coupled to the sender to a destination device, wherein the destination device is a device configured to receive data from the receiver in a presumed reliable form;

organizing the data of the input data source into a sequence of one or more data blocks, each block having a block identifier associated therewith;

encoding a data block of the sequence of one or more data blocks into encoded data as a sequence of packets for the data block using an erasure code;

organizing data of a packet of the sequence of packets into a packet header and a packet payload;

including, in the packet header of the packet, representations of at least (1) a block size, (2) a global packet sequence number that uniquely identifies the packet relative to other packets of the data, (3) the block identifier of the data block, and (4) an encoding identifier that identifies the encoded data carried in the packet payload generated from the block;

including, in the packet payload of the packet, the encoded data identified by the block identifier of the data block and the encoding identifier included in the packet header;

determining a sendable number of packets for the data block representing a target number of packets to send for the data block;

comparing a total number of sent packets, sent from the sequence of packets for the data block, and the sendable number; and based on whether the total number of sent packets is less than the sendable number, sending the packet to the receiver, wherein determining the sendable number comprises:
(a) determining a function, E( ), that maps an integer number of packets sent from the sequence of packets for the data block to an estimate of the number of packets expected to arrive at the receiver from the sequence of packets for the data block, wherein if X is equal to the integer number of packets sent from the sequence of packets for the data block, then E(X) is equal to the estimate of the number of the sent packets expected to arrive at the receiver, with E(X) determined for at least one value of X;
(b) determining a target value for a number of packets to arrive at the receiver equal to a sum of the block size and a predetermined additional number; and
(c) setting the sendable number to be a value, N, with N being selected such that E(N) is approximately equal to the target value.

2. The method of claim 1, wherein the predetermined additional number is determined based on the block size in units of packet payloads of the data block.

3. The method of claim 1, wherein the predetermined additional number is a square root of the block size in units of packet payloads of the data block.

4. The method of claim 1, wherein the predetermined additional number is a constant multiplied by a square root of the block size in units of packet payloads of the data block.

5. The method of claim 4, wherein the constant is 1.5.

6. The method of claim 1, wherein the sendable number of packets, N, for the block is calculated based on a packet loss estimate, pest, wherein E(N)=N*(1−pest).

7. The method of claim 1, wherein the data block is recoverable at the receiver from receiving a subset of the sequence of packets for the data block, and wherein the number of packets in the subset is greater than or equal to the block size of the data block in units of packet payloads.

8. The method of claim 1, wherein the sender sends packets at a rate that is determined by application requirements and an amount of bandwidth available between the sender and the receiver.

9. The method of claim 1, further comprising sending, at the sender, a next packet to the receiver from an earliest data block that is earliest in the sequence of one or more data blocks for which the sender has not received confirmation from the receiver that the earliest data block has been received and for which the number of packets sent so far from the earliest data block is less than the sendable number of packets for the earliest data block.

10. The method of claim 1, wherein the sequence of packets for the data block comprises base packets and repair packets, wherein packet payloads of base packets include portions of the data block, and packet payloads of repair packets include encoded data that is generated based on the data block using an erasure code.

11. The method of claim 1, wherein the sequence of packets for the data block comprises repair packets, wherein packet payloads of repair packets include encoded data that is generated based on the data block using an erasure code.

12. A method of transmitting data of an input data source from a sender to a receiver with reliability of transmission, wherein the reliability of transmission is indicated by a confirmation from the receiver to the sender that the data is considered received, the method comprising:

obtaining the data of the input data source, to be sent from a source device coupled to the sender to a destination device, wherein the destination device is a device configured to receive data from the receiver in a presumed reliable form;

organizing the data of the input data source into a sequence of one or more data blocks, each block having a block identifier associated therewith;

encoding a data block of the sequence of one or more data blocks into encoded data as a sequence of packets for the data block using an erasure code;

organizing data of a packet of the sequence of packets into a packet header and a packet payload;

including, in the packet header of the packet, representations of at least (1) a block size, (2) a global packet sequence number that uniquely identifies the packet relative to other packets of the data, (3) the block identifier of the data block, and (4) an encoding identifier that identifies the encoded data carried in the packet payload generated from the block;

including, in the packet payload of the packet, the encoded data identified by the block identifier of the data block and the encoding identifier included in the packet header;

determining a sendable number of packets for the data block representing a target number of packets to send for the data block;

comparing a total number of sent packets, sent from the sequence of packets for the data block, and the sendable number;

based on whether the total number of sent packets is less than the sendable number, sending the packet to the receiver;

receiving, at the sender, feedback from the receiver, the feedback comprising a feedback global packet sequence number corresponding to a largest global packet sequence number received at the receiver among correctly received packets of all data blocks of the sequence of the one or more data blocks up to some point in time, and a corresponding feedback global packet count corresponding to a total number of correctly received packets of all data blocks of the sequence of one or more data blocks at the receiver up to the same point, wherein determining the sendable number of packets for the data block is based, at least in part, on one or more received feedback global packet sequence numbers and corresponding feedback global packet counts.

13. The method of claim 12, wherein determining the sendable number comprises:

determining a packet loss estimate, pest, that is determined, at least in part, on one or more received feedback global packet sequence numbers and corresponding feedback global packet counts;

determining a target value for a number of packets to arrive at the receiver equal to a sum of the block size and a predetermined additional number; and setting the sendable number to be a value, N, with N being selected such that N*(1−pest) is approximately equal to the target value.

14. The method of claim 13, wherein determining an updated value for the packet loss estimate comprises calculating, at the sender, an updated packet loss estimate based on an updated feedback global packet sequence number and corresponding updated feedback global packet count using an exponentially weighted moving average packet loss calculation, where a half-life of the exponentially weighted moving average is approximately a difference between the global packet sequence number in the packet header of the most recent packet sent by the sender and a highest feedback sequence number received in feedback from the receiver.

15. The method of claim 12, further comprising:
receiving, at the sender, an updated feedback global packet sequence number and corresponding feedback global packet count; and
determining, at the sender, an updated sendable number of packets for the data block determined, at least in part, based on the updated feedback global packet sequence number and corresponding updated feedback global packet count.

16. The method of claim 15, further comprising receiving, at the sender, one or more additional updated feedback global packet sequence number and corresponding updated feedback global packet count in a feedback packet from the receiver.

17. The method of claim 12, further comprising:
receiving, at the sender, feedback from the receiver comprising a feedback block packet count for the data block indicating a total number of packets received for the data block at the receiver;
determining, at the sender, the sendable number of packets for the data block, at least in part, based on one or more feedback global packet sequence numbers and corresponding feedback global packet counts and the feedback block packet count.

18. The method of claim 17, wherein the sendable number is a sum of S and N, where S is a total number of already sent packets from the sequence of packets for the data block having a global packet sequence number no greater than L, where L is the largest feedback global packet sequence number received at the sender from the receiver, where N is determined so that a sum of E(N) and C is approximately equal to a sum of the block size and a predetermined additional number, where E(N) is an estimate of the number of packets expected to arrive at the receiver from sending N packets from the sequence of packets for the data block containing a global packet sequence number that is larger than L, and where C is the largest feedback block packet count for the block received at the sender from the receiver.

19. The method of claim 17, further comprising:
receiving, at the sender, an updated feedback global packet sequence number and corresponding feedback global packet count and an updated feedback block packet count; and
determining, at the sender, an updated sendable number of packets for the data block based on the updated feedback global packet sequence number and corresponding feedback global packet count and the updated feedback block packet count.

20. The method of claim 19, further comprising receiving, at the sender, receiving feedback block packet counts for one or more data blocks in a feedback packet from the receiver.

21. The method of claim 19, further comprising receiving, at the sender, receiving one or more feedback global packet sequence numbers and corresponding feedback global packet counts and feedback block packet counts for one or more data blocks in a feedback packet from the receiver.

22. The method of claim 12, wherein the data block is recoverable at the receiver from receiving a subset of the sequence of packets for the data block, and wherein the number of packets in the subset is greater than or equal to the block size of the data block in units of packet payloads.

23. The method of claim 12, wherein the sender sends packets at a rate that is determined by application requirements and an amount of bandwidth available between the sender and the receiver.

24. The method of claim 12, further comprising sending, at the sender, a next packet to the receiver from an earliest data block that is earliest in the sequence of one or more data blocks for which the sender has not received confirmation from the receiver that the earliest data block has been received and for which the number of packets sent so far from the earliest data block is less than the sendable number of packets for the earliest data block.

25. The method of claim 12, wherein the sequence of packets for the data block comprises base packets and repair packets, wherein packet payloads of base packets include portions of the data block, and packet payloads of repair packets include encoded data that is generated based on the data block using an erasure code.

26. The method of claim 12, wherein the sequence of packets for the data block comprises repair packets, wherein packet payloads of repair packets include encoded data that is generated based on the data block using an erasure code.

27. A method of transmitting data of an input data source from a sender to a receiver with reliability of transmission, wherein the reliability of transmission is indicated by a confirmation from the receiver to the sender that the data is considered received, the method comprising:
obtaining the data of the input data source, to be sent from a source device coupled to the sender to a destination device, wherein the destination device is a device configured to receive data from the receiver in a presumed reliable form;
organizing the data of the input data source into a sequence of one or more data blocks, each block having a block identifier associated therewith;
encoding a data block of the sequence of one or more data blocks into encoded data as a sequence of packets for the data block using an erasure code;
organizing data of a packet of the sequence of packets into a packet header and a packet payload;
including, in the packet header of the packet, representations of at least (1) a block size, (2) a global packet sequence number that uniquely identifies the packet relative to other packets of the data, (3) the block identifier of the data block, and (4) an encoding identifier that identifies the encoded data carried in the packet payload generated from the block;
including, in the packet payload of the packet, the encoded data identified by the block identifier of the data block and the encoding identifier included in the packet header;
determining a sendable number of packets for the data block representing a target number of packets to send for the data block;

comparing a total number of sent packets, sent from the sequence of packets for the data block, and the sendable number; and based on whether the total number of sent packets is less than the sendable number, sending the packet to the receiver, wherein determining the sendable number comprises:
(a) receiving, at the sender, a feedback block packet count for the data block;
(b) receiving, at the sender, a feedback global sequence number;
(c) determining, at the sender, the number, Y, of packets that have been sent for the data block with a global sequence number at most the feedback global sequence number;
(d) determining a function, E( ), that maps an integer number of packets sent from the sequence of packets for the data block to an estimate of the number of packets expected to arrive at the receiver from the sequence of packets for the data block, wherein if X is equal to the integer number of packets sent from the sequence of packets for the data block, then E(X) is equal to the estimate of the number of these the sent packets expected to arrive at the receiver, with E(X) determined for at least one value of X;
(e) determining a target value for a number of packets to arrive at the receiver equal to a sum of the block size and a predetermined additional number; and
(f) setting the sendable number to be the sum of Y plus a value, N, with N being selected such that E(N) is approximately equal to the target value minus the feedback block packet count.

28. The method of claim 27, wherein the predetermined additional number is a square root of the block size in units of packet payloads of the data block.

29. The method of claim 27, wherein determining E(N) from N is based on a packet loss estimate that is determined, at least in part, based on one or more feedback global packet sequence numbers and corresponding feedback global packet counts.

30. The method of claim 27, wherein the data block is recoverable at the receiver from receiving a subset of the sequence of packets for the data block, and wherein the number of packets in the subset is greater than or equal to the block size of the data block in units of packet payloads.

31. The method of claim 27, wherein the sender sends packets at a rate that is determined by application requirements and an amount of bandwidth available between the sender and the receiver.

32. The method of claim 27, further comprising sending, at the sender, a next packet to the receiver from an earliest data block that is earliest in the sequence of one or more data blocks for which the sender has not received confirmation from the receiver that the earliest data block has been received and for which the number of packets sent so far from the earliest data block is less than the sendable number of packets for the earliest data block.

33. The method of claim 27, wherein the sequence of packets for the data block comprises base packets and repair packets, wherein packet payloads of base packets include portions of the data block, and packet payloads of repair packets include encoded data that is generated based on the data block using an erasure code.

34. The method of claim 27, wherein the sequence of packets for the data block comprises repair packets, wherein packet payloads of repair packets include encoded data that is generated based on the data block using an erasure code.

* * * * *